(12) United States Patent
Li et al.

(10) Patent No.: US 11,661,127 B2
(45) Date of Patent: May 30, 2023

(54) MODULAR GROUND VEHICLE AND FLIGHT VEHICLE SHARING SYSTEM

(71) Applicant: Zhejiang Geely Holding Group Co., LTD., Hangzhou (CN)

(72) Inventors: Shufu Li, Hangzhou (CN); Jian Yang, Hangzhou (CN); Carl Dietrich, Petaluma, CA (US)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 518 days.

(21) Appl. No.: 16/643,562

(22) PCT Filed: Aug. 27, 2018

(86) PCT No.: PCT/CN2018/102579
§ 371 (c)(1),
(2) Date: Feb. 29, 2020

(87) PCT Pub. No.: WO2019/042262
PCT Pub. Date: Mar. 7, 2019

(65) Prior Publication Data
US 2020/0198782 A1   Jun. 25, 2020

(30) Foreign Application Priority Data
Aug. 31, 2017   (CN) .......................... 201710775610.2

(51) Int. Cl.
*B62D 63/02*   (2006.01)
*B60P 3/11*    (2006.01)
(Continued)

(52) U.S. Cl.
CPC ............. *B62D 63/025* (2013.01); *B60P 3/11* (2013.01); *B64F 1/04* (2013.01); *B64F 1/10* (2013.01);
(Continued)

(58) Field of Classification Search
CPC ............. B62D 63/025; B60P 3/11; B64F 1/10
See application file for complete search history.

(56) References Cited

U.S. PATENT DOCUMENTS

| 3,005,653 | A  |   | 10/1961 | Becker |
| 7,946,530 | B1 | * | 5/2011  | Talmage, Jr. ........... B64C 39/02 244/140 |

(Continued)

FOREIGN PATENT DOCUMENTS

| CN | 101054114 A | 10/2007 |
| CN | 104134342 A | 11/2014 |

(Continued)

OTHER PUBLICATIONS

J. Mund, P. Latzel, H. Fricke, "Can LiDAR Point Clouds Effectively Contribute to Safer Apron Operations? Results of an Experimental Controller-in-the-Loop Study", 6th SESAR Innovation Days, Nov. 8-10, 2016, pp. 1-9, SESAR, the Netherlands.

(Continued)

*Primary Examiner* — Brady W Frazier
*Assistant Examiner* — Shanna Danielle Glover
(74) *Attorney, Agent, or Firm* — Cheng-Ju Chiang

(57) ABSTRACT

A modular flying car includes a ground vehicle and a flight vehicle. The ground vehicle includes a chassis, a first cabin and a landing platform for landing the flight vehicle. The flight vehicle includes a second cabin and a flight driving device. The flight vehicle is capable of landing and taking off vertically on the landing platform and connected with the ground vehicle by interlocking. Users can choose to travel by the ground vehicle or the flight vehicle, and can transfer between the ground vehicle and the flight vehicle, to solve the traffic jam problem and make the realization of the flying car more feasible. A flying car system and a flying car sharing method are also disclosed.

11 Claims, 11 Drawing Sheets

(51) Int. Cl.
  *B64F 1/10* (2006.01)
  *G08G 1/00* (2006.01)
  *G08G 7/00* (2006.01)
  *H04L 67/12* (2022.01)
  *G06Q 50/30* (2012.01)
  *G08G 1/14* (2006.01)
  *B64F 1/04* (2006.01)
  *G08G 5/00* (2006.01)
  *H04W 4/40* (2018.01)
  *H04W 4/02* (2018.01)

(52) U.S. Cl.
  CPC ............ *G06Q 50/30* (2013.01); *G08G 1/142* (2013.01); *G08G 1/202* (2013.01); *G08G 5/0069* (2013.01); *G08G 7/00* (2013.01); *H04L 67/12* (2013.01); *G08G 5/0039* (2013.01); *H04W 4/02* (2013.01); *H04W 4/40* (2018.02)

(56) References Cited

U.S. PATENT DOCUMENTS

| | | | |
|---|---|---|---|
| 9,027,879 | B1 | 5/2015 | Talmage, Jr. |
| 9,809,305 | B2 * | 11/2017 | Buchmueller ......... G08G 5/025 |
| 9,969,490 | B2 * | 5/2018 | Duncan ................ B64C 39/022 |
| 2014/0257595 | A1 * | 9/2014 | Tillmann ............... G01C 11/02 701/2 |
| 2016/0306355 | A1 | 10/2016 | Gordon et al. |
| 2016/0368600 | A1 | 12/2016 | Frolov et al. |
| 2017/0123421 | A1 * | 5/2017 | Kentley ................ G06Q 10/00 |
| 2017/0197710 | A1 | 7/2017 | Ma |
| 2017/0240294 | A1 | 8/2017 | Chen et al. |
| 2018/0001812 | A1 * | 1/2018 | Friemel ................. B62D 63/08 |

FOREIGN PATENT DOCUMENTS

| | | |
|---|---|---|
| CN | 104346921 A | 2/2015 |
| CN | 104703141 A | 6/2015 |
| CN | 104760705 A | 7/2015 |
| CN | 204626268 U | 9/2015 |
| CN | 105185100 A | 12/2015 |
| CN | 205417316 U | 8/2016 |
| CN | 205468729 U | 8/2016 |
| CN | 104760705 B | 9/2016 |
| CN | 106004626 A | 10/2016 |
| CN | 106652437 A | 5/2017 |
| CN | 106892131 A | 6/2017 |
| CN | 107627945 A | 1/2018 |
| DE | 2601228 A1 | 7/1977 |
| EP | 2327571 A2 | 6/2011 |
| JP | S62-57560 B2 | 12/1987 |
| JP | H9-302628 A | 11/1997 |
| JP | 2010-47109 A | 3/2010 |
| JP | 2016-91411 A | 5/2016 |
| JP | 2016-199144 A | 12/2016 |
| JP | 2016-210417 A | 12/2016 |
| KR | 10-2005-0065299 A | 6/2005 |
| KR | 10-1491076 B1 | 2/2015 |
| RU | 2616451 C2 | 4/2017 |
| WO | 2004/087499 A2 | 10/2004 |
| WO | 2017/128927 A1 | 8/2017 |

OTHER PUBLICATIONS

Shane McGlaun, "Rinspeed Etos Driverless Concept Car Features a Drone Landing Pad", Oct. 12, 2015, Rinspeed.edu at Slashgear.com.

* cited by examiner

MODULAR GROUND VEHICLE AND FLIGHT VEHICLE SHARING SYSTEM

CROSS-REFERENCE TO RELATED APPLICATION

The present application is a 35 U.S.C. § 371 National Phase conversion of International Patent Application No. PCT/CN2018/102579, filed on Aug. 27, 2018, which is based on and claims the priority of Chinese patent application No. 201710775610.2, filed on Aug. 31, 2017. The entire disclosure of the above-identified applications is incorporated herein by reference. The PCT International Patent Application was filed and published in English.

TECHNICAL FIELD

The present application relates to the technical field of combined applications of automobiles with aircrafts, and particularly to a modular flying car, a flying car system, and a flying car sharing method.

BACKGROUND ART

In the field of automobiles and aircrafts, a kind of flying car appears now. The flying car is equipped with propeller or jet turbine. It can not only drive on the ground, but also can form the shape of a plane by mechanical deformation. It can glide or realize vertical takeoff and landing (VTOL). When the road is not unimpeded or the road is far away, it can fly directly to the destination and better solve the traffic jam problem.

It is well known that a good chassis is essential for a car to achieve good road driving performance. The chassis includes a large number of transmission devices and has a large weight, which is contradictory to the requirements of lightweight for aircrafts. Further, according to the principle of aerodynamics, a car needs to provide good downward pressure if it needs to drive stably, but an aircraft is completely opposite and it needs good rising force. This has brought difficulty to the aerodynamic design of the shape of the flying car, and has not been solved well till now.

TECHNICAL SOLUTION

In view of above, the present application provides a modular flying car which includes a ground vehicle and a flight vehicle capable of landing on the ground vehicle, wherein the users can choose to travel by the ground vehicle or the flight vehicle, and can transfer between the ground vehicle and the flight vehicle, to solve the traffic jam problem and make the realization of the flying car more feasible.

In an embodiment, the present application provides a modular flying car. The modular flying car includes a ground vehicle and a flight vehicle. The ground vehicle includes a chassis, a first cabin and a landing platform. The landing platform is configured for landing the flight vehicle. The flight vehicle includes a second cabin and a flight driving device. The flight vehicle is capable of landing vertically on the landing platform and connected with the ground vehicle by interlocking, and the flight vehicle is capable of taking off vertically from the landing platform.

In an embodiment, the present application provides a ground vehicle. The ground vehicle includes a chassis, a cabin and a landing platform. The landing platform is configured for landing a flight vehicle.

In an embodiment, the present application provides a flight vehicle. The flight vehicle includes a cabin and a flight driving device. The flight vehicle is capable of landing vertically on a landing platform formed on a ground vehicle and connected with the ground vehicle, and the flight vehicle is capable of taking off vertically from the landing platform.

In an embodiment, the present application further provides a flying car system. The flying car system includes a ground vehicle, a flight vehicle and a server. The ground vehicle includes a chassis, a first cabin, a landing platform, a driving controller and a first communication module. The landing platform is configured for landing the flight vehicle. The first communication module is connected with the driving controller. The flight vehicle includes a second cabin, a flight driving device, a flight controller and a second communication module. The second communication module is connected with the flight controller. The server includes a third communication module. The flight vehicle is capable of landing vertically on the landing platform and connected with the ground vehicle by interlocking, and the flight vehicle is capable of taking off vertically from the landing platform. The ground vehicle and the server are communicated with each other wirelessly via the first communication module and the third communication module. The flight vehicle and the server are communicated with each other wirelessly via the second communication module and the third communication module.

In an embodiment, the present application provides a flying car sharing method. The ground vehicle and the flight vehicle can be shared under the premise of payment. A user can communicate with the server using the terminal to realize calling the ground vehicle and the flight vehicle. In use, the user can transfer between the ground vehicle and the flight vehicle. After use, the user can return the ground vehicle and the flight vehicle while paying certain fees. The following several scenarios of use are given for example.

Scenario one: at the starting point A, the user can send a call request for calling a ground vehicle to the server through the terminal, the server allocates a ground vehicle for the user according to the call request, so that the user can travel by the ground vehicle. After reaching the destination C, the user can send a return request for returning the ground vehicle to the server through the terminal while paying the fees for the use of the ground vehicle, so that the ground vehicle is returned back to the lessor.

Scenario two: at the starting point A, the user can send a call request for calling a ground vehicle to the server through the terminal, the server allocates a ground vehicle for the user according to the call request, so that the user can travel by the ground vehicle. When reaching the midway B, if there is a traffic jam or a bad road condition, the user can send a call request for calling a flight vehicle to the server through the terminal, the server allocates a flight vehicle for the user according to the call request, the flight vehicle flies above and lands on the landing platform of the ground vehicle, so that the user can transfer from the ground vehicle to the flight vehicle and continue to travel by the flight vehicle. After transferring to the flight vehicle, the user can send a return request for returning the ground vehicle to the server through the terminal while paying the fees for the use of the ground vehicle, so that the ground vehicle is returned back to the lessor. After reaching the destination C, the user can send a return request for returning the flight vehicle to the server through the terminal while paying the fees for the use of the flight vehicle, so that the flight vehicle is returned back to the lessor.

Scenario three: at the starting point A, the user can send a call request for calling a flight vehicle to the server through the terminal, the server allocates a flight vehicle for the user according to the call request, so that the user can travel by the flight vehicle. After reaching the destination C, the user can send a return request for returning the flight vehicle to the server through the terminal while paying the fees for the use of the flight vehicle, so that the flight vehicle is returned back to the lessor.

Scenario four: at the starting point A, the user can send a call request for calling a flight vehicle to the server through the terminal, the server allocates a flight vehicle for the user according to the call request, so that the user can travel by the flight vehicle. When reaching the midway B, if the road condition becomes better and no traffic jam, the user can send a call request for calling a ground vehicle to the server through the terminal, the server allocates a ground vehicle for the user according to the call request, the flight vehicle lands on the landing platform of the ground vehicle, so that the user can transfer from the flight vehicle to the ground vehicle and continue to travel by the ground vehicle. After transferring to the ground vehicle, the user can send a return request for returning the flight vehicle to the server through the terminal while paying the fees for the use of the flight vehicle, so that the flight vehicle is returned back to the lessor. After reaching the destination C, the user can send a return request for returning the ground vehicle to the server through the terminal while paying the fees for the use of the ground vehicle, so that the ground vehicle is returned back to the lessor.

Scenario five: at the starting point A, the user can directly lease a ground vehicle from the lessor and travel by the ground vehicle. When reaching the midway B, if there is a traffic jam or a bad road condition, the user can send a call request for calling a flight vehicle to the server through the terminal, the server allocates a flight vehicle for the user according to the call request, the flight vehicle flies above and lands on the landing platform of the ground vehicle, so that the user can transfer from the ground vehicle to the flight vehicle and continue to travel by the flight vehicle. After transferring to the flight vehicle, the user can send a return request for returning the ground vehicle to the server through the terminal while paying the fees for the use of the ground vehicle, so that the ground vehicle is returned back to the lessor. After reaching the destination C, the user can send a return request for returning the flight vehicle to the server through the terminal while paying the fees for the use of the flight vehicle, so that the flight vehicle is returned back to the lessor.

Scenario six: at the starting point A, the user can directly lease a flight vehicle from the lessor and travel by the flight vehicle. When reaching the midway B, if the road condition becomes better and no traffic jam, the user can send a call request for calling a ground vehicle to the server through the terminal, the server allocates a ground vehicle for the user according to the call request, the flight vehicle lands on the landing platform of the ground vehicle, so that the user can transfer from the flight vehicle to the ground vehicle and continue to travel by the ground vehicle. After transferring to the ground vehicle, the user can send a return request for returning the flight vehicle to the server through the terminal while paying the fees for the use of the flight vehicle, so that the flight vehicle is returned back to the lessor. After reaching the destination C, the user can send a return request for returning the ground vehicle to the server through the terminal while paying the fees for the use of the ground vehicle, so that the ground vehicle is returned back to the lessor.

ADVANTAGEOUS EFFECTS

From above, the present application provides a modular flying car, a flying car system and a flying car sharing method. When the traffic is not unimpeded and the road condition is good, the users can choose to travel by the ground vehicle. When there is traffic jam or the road condition is not good, the users can choose to travel by the flight vehicle. Further, the users can transfer between the ground vehicle and the flight vehicle. As there is a landing platform formed on the ground vehicle, the flight vehicle can land on the landing platform of the ground vehicle, for facilitating the users to transfer between the ground vehicle and the flight vehicle. As such, even in the case of traffic jams, the users can reach their destinations quickly. Because the flight vehicle can fly independently, the flight vehicle does not need to design the chassis, and the ground vehicle does not have to consider the aerodynamic requirements of flight in design, so that the realization of the flying car is more feasible. Further, through the sharing of the ground vehicle and the flight vehicle, it provides the users with a new way of travel selection and improves the user experience.

MODE FOR INVENTION

Figure 1:
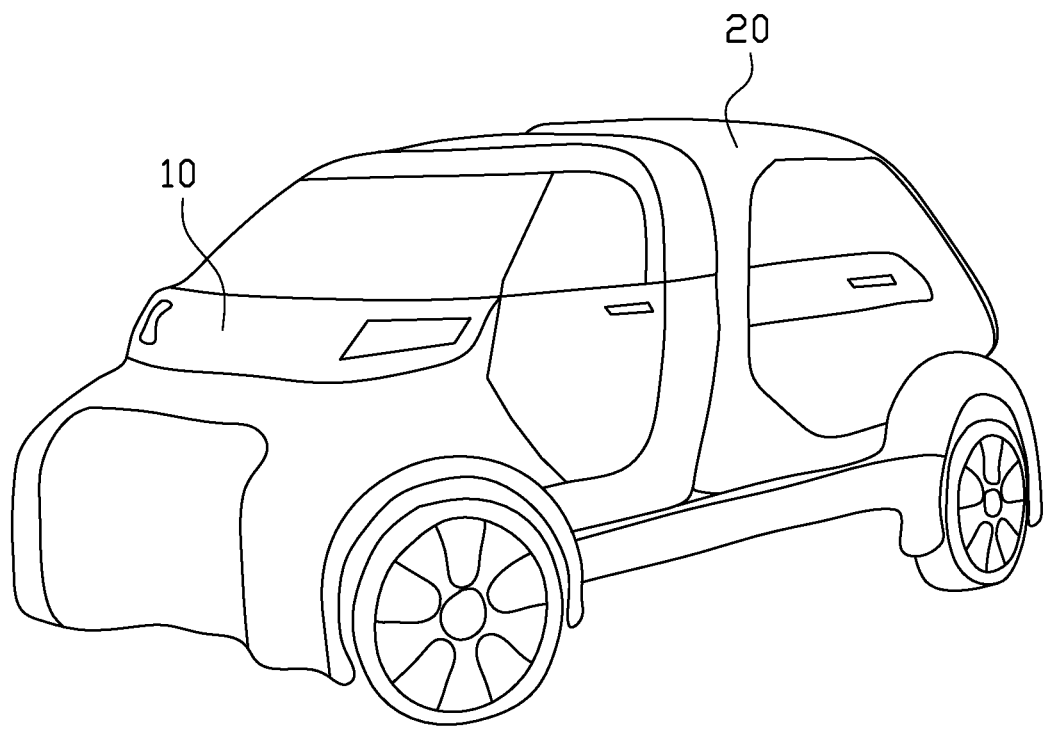
FIG. 1 is a schematic view of a modular flying car according to an embodiment of the present application.

In order to make the purposes, characteristics, and advantages of the present application more apparently, embodiments of the present application will now be described in more detail with reference to the drawing figures.

First Embodiment

Figure 2:
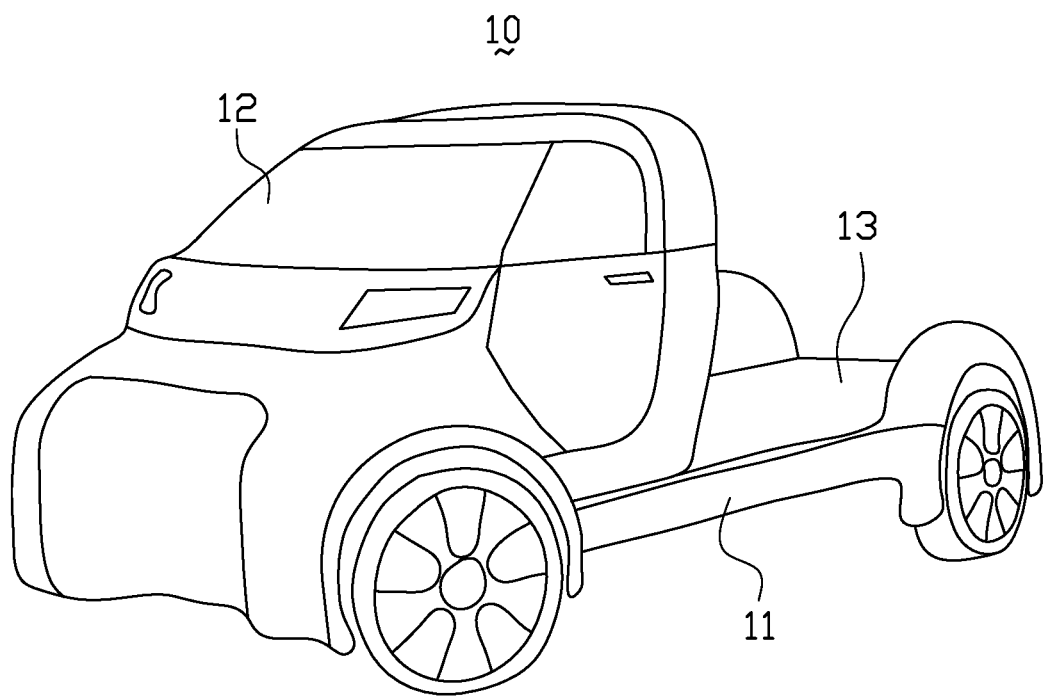
FIG. 2 is a schematic view of the ground vehicle of the modular flying car of FIG. 1.
Figure 3:
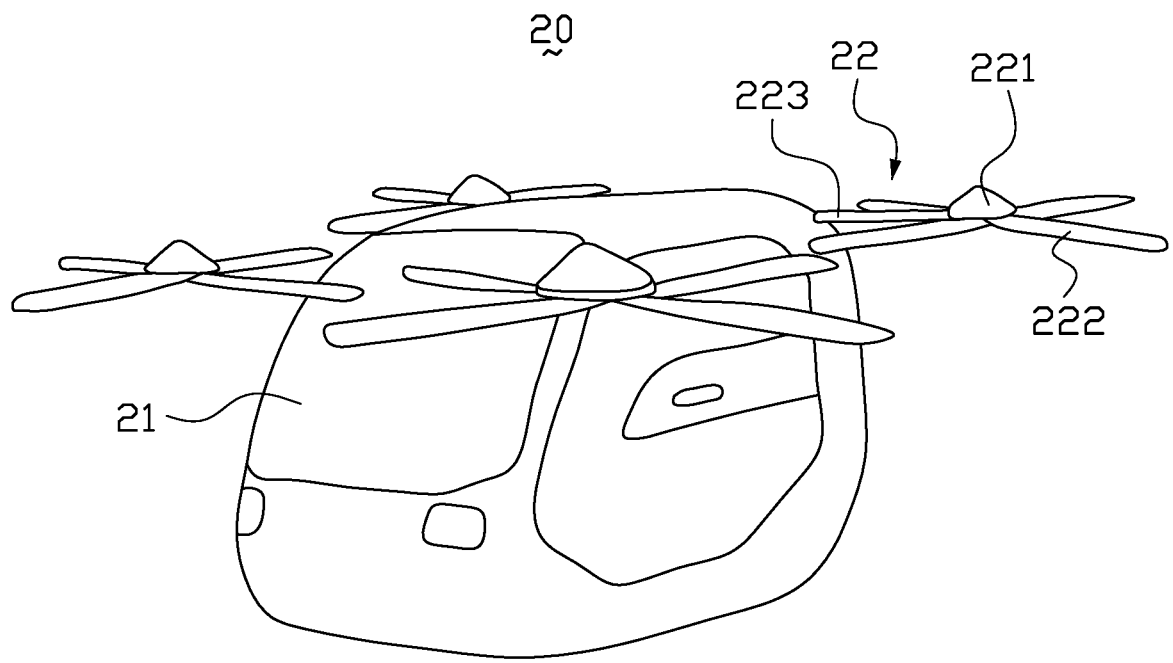
FIG. 3 is a schematic view of the flight vehicle of the modular flying car of FIG. 1.

Referring to FIGS. 1-3, a modular flying car is provided in a first embodiment of the present application. The flying car has a modular structure, and includes a ground vehicle 10 and a flight vehicle 20.

The ground vehicle 10 includes a chassis 11, a first cabin 12 and a landing platform 13. The landing platform 13 is used for landing the flight vehicle 20. The ground vehicle 10 further includes power system, transmission system, steering system, braking system, and control system, etc., so that the ground vehicle 10 is able to drive independently. Preferably, the ground vehicle 10 is able to drive autonomously without manual operations. That is, the ground vehicle 10 has autonomous driving capability on roads and highways.

The flight vehicle 20 includes a second cabin 21 and a flight driving device 22. The flight vehicle 20 further includes power device, transmission device, steering device, and control device, etc., so that the flight vehicle 20 is able to fly independently. Preferably, the flight vehicle 20 is able to fly autonomously without manual operations. That is, the flight vehicle 20 has autonomous flight capability.

The landing platform 13 of the ground vehicle 10 is provided for the flight vehicle 20 to land on. The flight vehicle 20 may be docked to the landing platform 13 of the ground vehicle 10. Specifically, the flight vehicle 20 is able to vertically land on the landing platform 13 and connected with the ground vehicle 10 by interlocking, and the flight vehicle 20 is able to take off vertically from the landing platform 13.

In the embodiment illustrated in FIGS. 1-3, the first cabin 12 is provided at a front end of the chassis 11, the landing platform 13 is provided at a rear end of the chassis 11. The landing platform 13 of the ground vehicle 10 is located behind the first cabin 12. When the flight vehicle 20 is landed on the landing platform 13 of the ground vehicle 10, the second cabin 21 and the first cabin 12 are adjoined with each other, to make the overall structure of the flying car compact. Herein, the ground vehicle 10 and the flight vehicle 20 each may have only a single row of seats. For example, when it is required to take only one or two occupants, a ground vehicle 10 with a single row of seats and a flight vehicle 20 with a single row of seats may be designed.

Referring to FIG. 1, when the flight vehicle 20 lands on the landing platform 13, the nose of the flight vehicle 20 faces towards the rear end of the ground vehicle 10, i.e., the nose of the flight vehicle 20 is disposed opposite to the head of the ground vehicle 10. The first cabin 12 is provided with a first cabin door confronting the second cabin 21, and the second cabin 21 is provided with a second cabin door confronting the first cabin 12. The first cabin door and the second cabin door may be electric doors and be opened simultaneously, so that the occupants can transfer conveniently between the ground vehicle 10 and the flight vehicle 20 via the first cabin door and the second cabin door, without the need to get off from the first cabin 12 or the second cabin 21. Further, the seats in the first cabin 12 and the second cabin 21 may be rotatable and can be rotated to face towards the cabin door, for facilitating the transfer for the occupants.

It is important that the ground vehicle 10 should be capable of supporting the precision landing of the flight vehicle 20 to the best extent possible because this will ensure normal operations can be conducted in most weather conditions. The flight vehicle 20 should keep people safe by physically removing spinning propellers from areas where people could walk. These problems may be solved by a ground vehicle 10 with a landing platform 13 that can lift the flight vehicle 20 high enough away from the ground that people cannot touch it but low enough when driving that people can easily ingress/egress.

Figure 4:
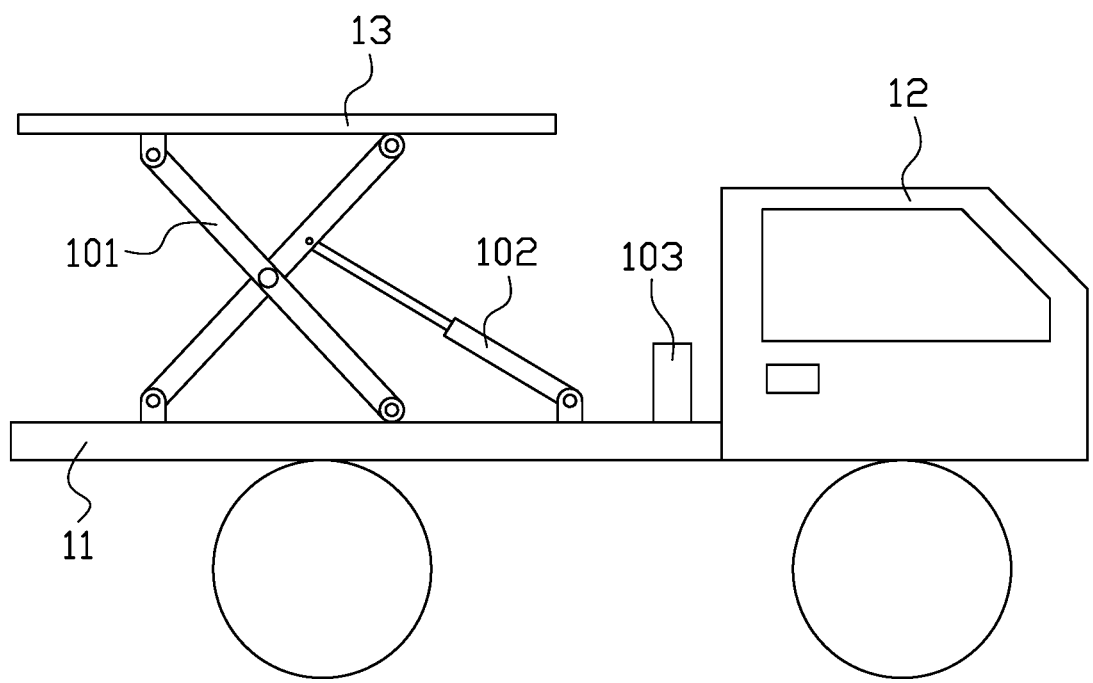
FIG. 4 is a schematic view of the landing platform of the ground vehicle according to an embodiment of the present application.

For example, as shown in FIG. 4, when the landing platform 13 is provided at the rear end of the chassis 11, a height of the landing platform 13 may be regulated up and down relative to the chassis 11. When the flight vehicle 20 performs takeoff or landing, the ground vehicle 10 may elevate the landing platform 13 up to a safety height, to keep people on the ground away from spinning propellers. Also, the ground vehicle 10 may lower the landing platform 13 down to a suitable height, for facilitating the occupants to get on/off the flight vehicle 20 or transfer between the ground vehicle 10 and the flight vehicle 20.

Specifically, the landing platform 13 may be supported on the chassis 11 of the ground vehicle 10 by a supporting frame 101. The supporting frame 101 is connected with the chassis 11 through a driving device 102. The driving device 102 is, for example, a hydraulic cylinder or an air cylinder. When the driving device 102 extends out or retracts back, the supporting frame 101 is driven to bring the landing platform 13 to move up or down relative to the chassis 11. When the driving device 102 extends out, the landing platform 13 is raised up by the supporting frame 101, and when the driving device 102 retracts back, the landing platform 13 is lowered down by the supporting frame 101.

Figure 5:
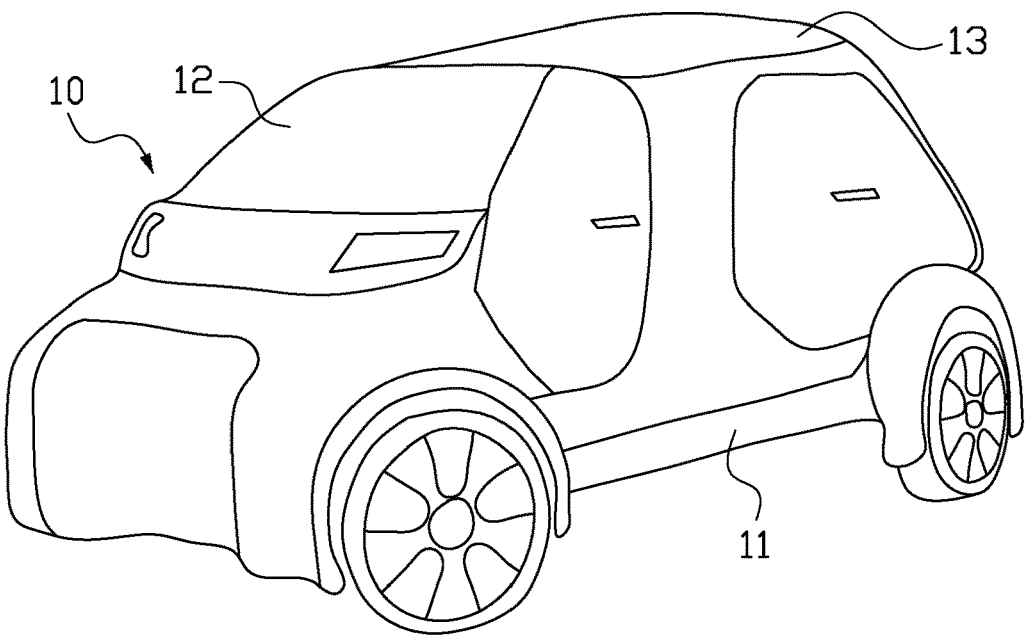
FIG. 5 is a schematic view of the ground vehicle according to another embodiment of the present application.
Figure 6:
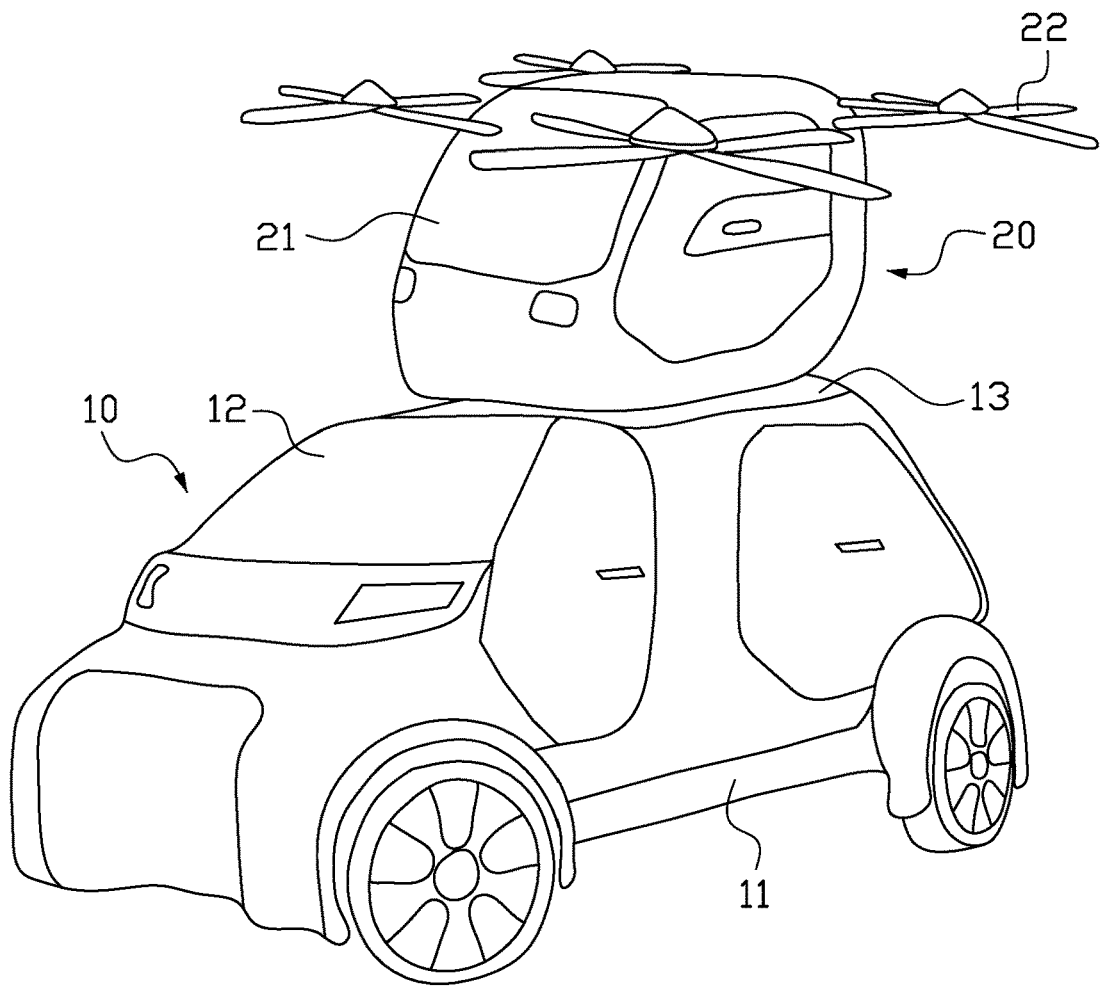
FIG. 6 is a schematic view showing the flight vehicle is landed on the ground vehicle of FIG. 5.

In another embodiment as shown in FIGS. 5-6, the first cabin 12 is formed on the chassis 11, and a top of the first cabin 12 functions as the landing platform 13. When the flight vehicle 20 lands on the landing platform 13, the flight vehicle 20 is docked to the top of the ground vehicle 10, so long as it meets the height limit requirements of the roads. In this case, the ground vehicle 10 may have two rows of seats, to satisfy the need for taking more occupants. However, the flight vehicle 20 may be of a single row of seats for taking one or two occupants, to decrease the overall weight of the flight vehicle 20 and reduce the difficulty of design for the flight vehicle 20.

When the flight vehicle 20 lands vertically on the ground vehicle 10, the ground vehicle 10 can effectively transfer the collision loads from the flight vehicle 20 to the ground vehicle 10.

During landing, the ground vehicle 10 can guide the flight vehicle 20 to realize vertical landing and docking. For example, the ground vehicle 10 is provided with a lidar device 103 (as shown in FIG. 4). The lidar device 103 can detect the existence of potential risks around the landing area, the on-board computer can automatically assess whether the landing area meets the minimum requirements for landing, and the assessing result is sent to the flight vehicle 20 via encrypted data link. Further, the pilot of the flight vehicle 20 can also conduct a visual safety assessment of the landing area to ensure consistency with the automatic assessment result.

The lidar device 103 can further be used for performing alignment between the flight vehicle 20 and the landing platform 13 when the flight vehicle 20 is landing on the landing platform 13. When the flight vehicle 20 flies above the landing platform 13 to be ready for landing on the ground vehicle 10, the flight vehicle 20 and the ground vehicle 10 communicate with each other via short-distance wireless communication technology. After the flight vehicle 20 is aligned with the landing platform 13 by using the lidar device 103, the flight vehicle 20 lands onto the landing platform 13 vertically.

Through two-way encrypted data link between the ground vehicle 10 and the flight vehicle 20, the ground vehicle 10 can provide guidance for the precise landing of the flight vehicle 20. The two-way encrypted data link between the ground vehicle 10 and the flight vehicle 20 has wireless data transmission, high bandwidth, high speed and strong anti-electromagnetic interference capability.

The ground vehicle 10 can provide the following information and guidance for the precise landing of the flight vehicle 20: real-time wind velocity and direction, barometric pressure, temperature, humidity, azimuth (magnetic heading) and elevation angles of the landing platform 13, differential GPS base station (GPS position), near-IR beacon lights, high-contrast optical alignment markings/lights, LIDAR detection for obstacles, encrypted data connection between the ground vehicle 10 and the flight vehicle 20.

When the flight vehicle 20 is docked to the landing platform 13 of the ground vehicle 10, the ground vehicle 10 and the flight vehicle 20 are connected by interlocking with each other. A first locking device 14 is formed on the landing platform 13, and a second locking device 24 is formed on a bottom portion of the flight vehicle 20. When the flight vehicle 20 lands on the landing platform 13, the first locking device 14 and the second locking device 24 are connected by interlocking with each other, so that the flight vehicle 20 is docked to the ground vehicle 10 by interlocking.

Figure 7:
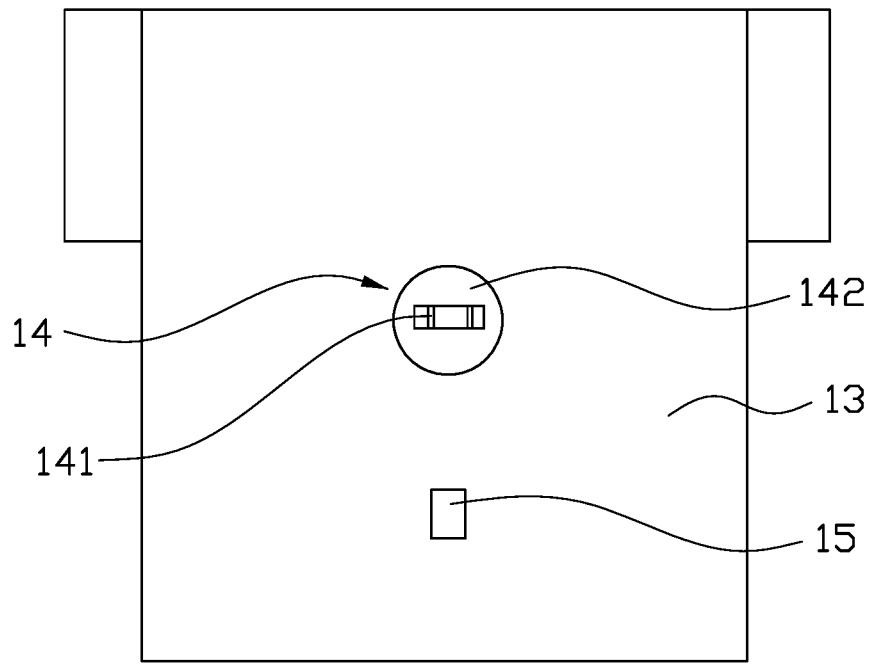
FIG. 7 is a schematic view of the first locking device according to an example of the present application.
Figure 8:
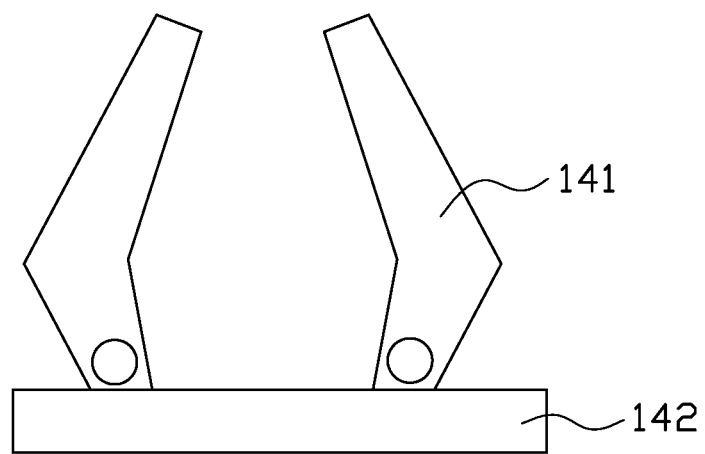
FIG. 8 is a schematic view of the second locking device according to an example of the present application.
Figure 9:
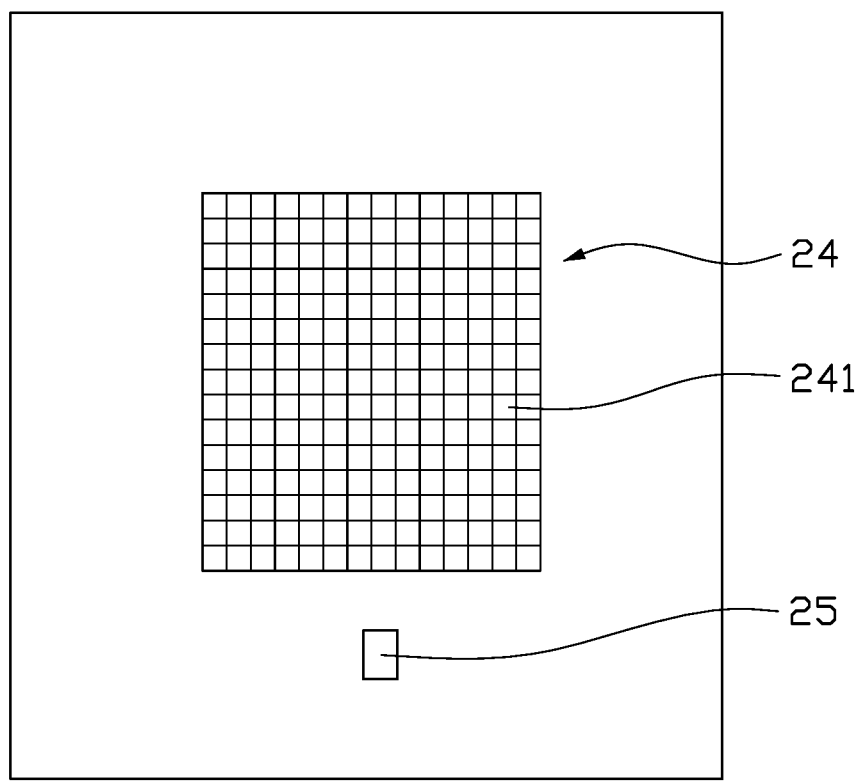
FIG. 9 is a partially schematic view of the first locking device according to the example of the present application.

In an example as shown in FIGS. 7-9, the first locking device 14 includes claws 141 formed on the landing platform 13, and the second locking device 24 includes grooves 241. The claws 141 are insertable into the grooves 241. Specifically, the second locking device 24 may be a fixing grid defined with a plurality of grooves 241. Further, the claws 141 is rotatable on the landing platform 13, in order to reduce the connecting accuracy requirement when the flight vehicle 20 lands on the landing platform 13 of the ground vehicle 10. The first locking device 14 further includes a supporting base 142 formed on the landing platform 13, and the claws 141 are formed on the supporting base 142.

Figure 10:
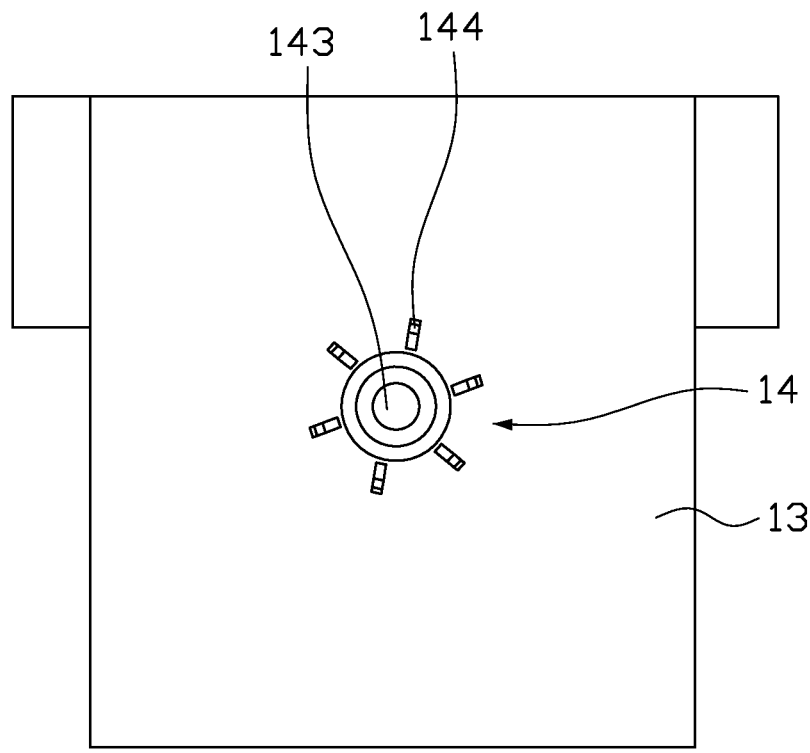
FIG. 10 is a schematic view of the first locking device according to another example of the present application.
Figure 11:
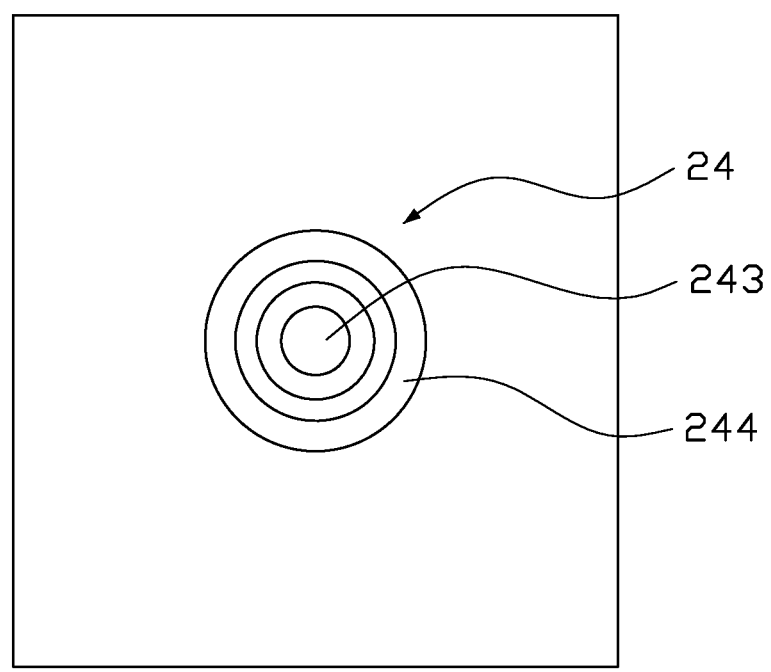
FIG. 11 is a schematic view of the second locking device according to another example of the present application.
Figure 12:
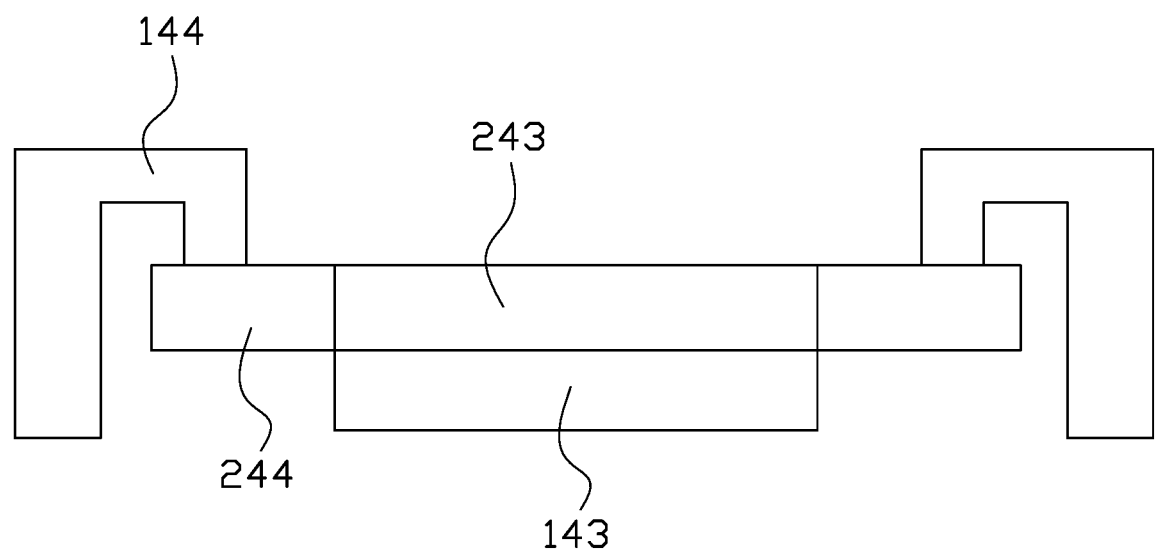
FIG. 12 is a schematic view of the first locking device interlocked with the second locking device according to the another example of the present application.

In another example as shown in FIGS. 10-12, the first locking device 14 includes a first sucker 143 and a hook 144, and the second locking device 24 includes a second sucker 243 and an engaging portion 244. The first sucker 143 and the second sucker 243 are fixed by adsorption with each other, the engaging portion 244 is engaged with the hook 144, thereby locking the flight vehicle 20 to the ground vehicle 10. The first sucker 143 and the second sucker 243 may be magnetic sucker or vacuum sucker. Under the adsorption force between the first sucker 143 and the second sucker 243, the flight vehicle 20 and the ground vehicle 10 are aligned automatically.

Figure 13:
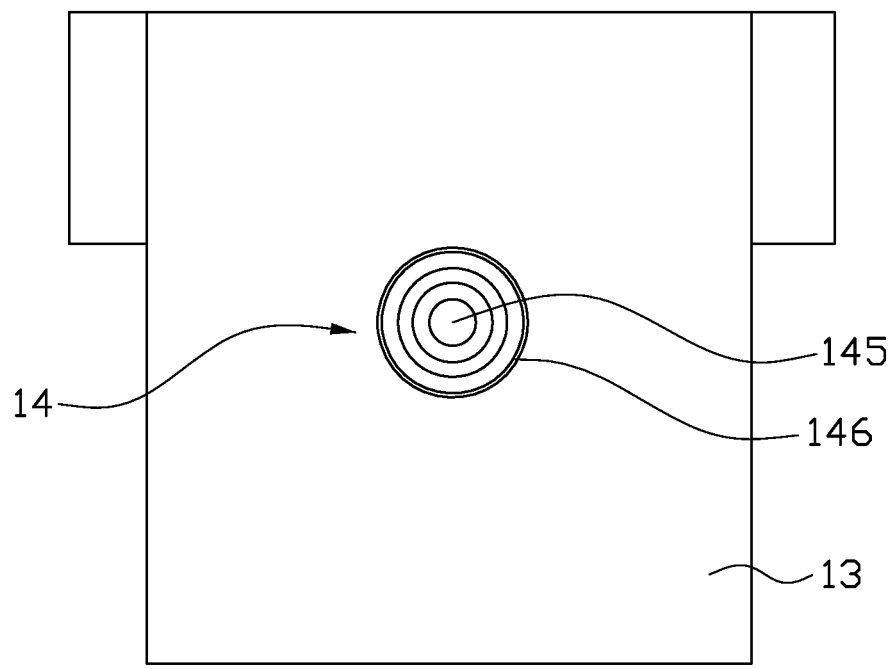
FIG. 13 is a schematic view of the first locking device according to a further example of the present application.
Figure 14:
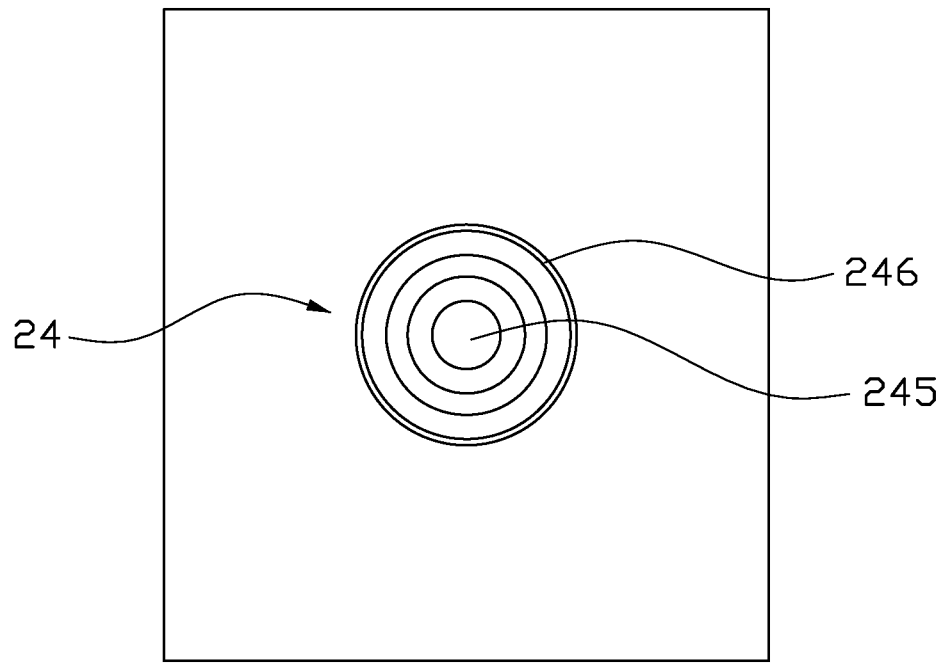
FIG. 14 is a schematic view of the second locking device according to a further example of the present application.
Figure 15:
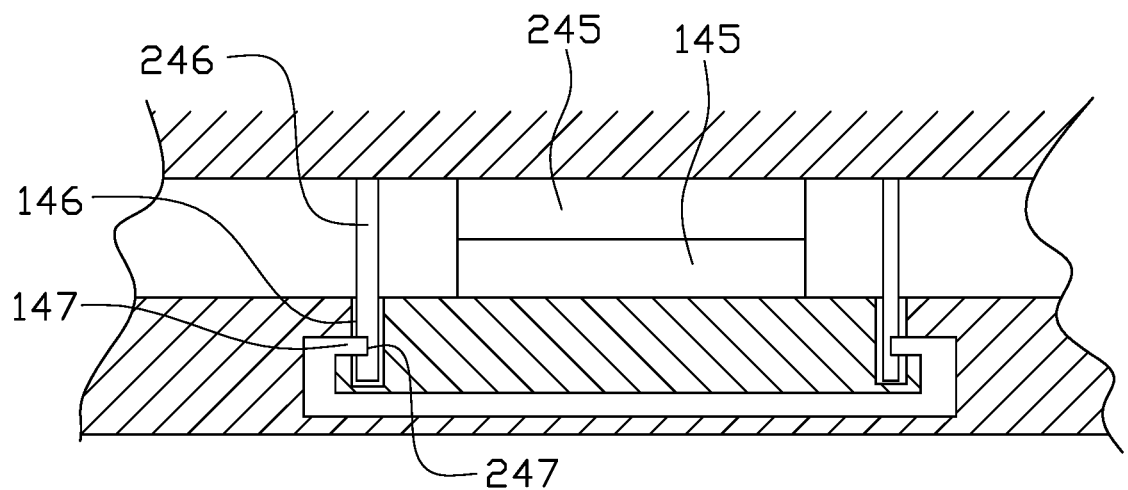
FIG. 15 is a schematic view of the first locking device interlocked with the second locking device according to the further example of the present application.

In a further example as shown in FIGS. 13-15, the first locking device 14 includes a first sucker 145, an inserting groove 146 and a locking portion 147 formed in the inserting groove 146. The second locking device 24 includes a second sucker 245, an inserting pole 246 and a locking groove 247 formed in the inserting pole 246. The first sucker 145 and the second sucker 245 are fixed by adsorption with each other, the inserting pole 246 is inserted into the inserting groove 146, the locking portion 147 is locked in the locking groove 247 to fix the inserting pole 246 in the inserting groove 146, thereby locking the flight vehicle 20 to the ground vehicle 10. The first sucker 145 and the second sucker 245 may be magnetic sucker or vacuum sucker. Under the adsorption force between the first sucker 145 and the second sucker 245, the flight vehicle 20 and the ground vehicle 10 are aligned automatically.

The power of the ground vehicle 10 can adopt pure electric mode or hybrid mode, and the power of the flight vehicle 20 can adopt pure electric mode or hybrid mode.

When the flight vehicle 20 is docked to the ground vehicle 10, the flight vehicle 20 can be charged by the ground vehicle 10. Specifically, a first socket 15 (as shown in FIG. 7) is formed on the landing platform 13 of the ground vehicle 10, a second socket 25 (as shown in FIG. 9) is formed on the flight vehicle 20 correspondingly. When the flight vehicle 20 lands on the landing platform 13 stably, the second locking device 24 and the first locking device 14 are interlocked, the first socket 15 and the second socket 25 are connected by plug-in, the flight vehicle 20 and the ground vehicle 10 are electrically connected with each other, and the ground vehicle 10 is able to charge the flight vehicle 20.

The ground vehicle 10 may have a battery pack. The minimum power supply mileage of the battery pack should be twice the distance between two farthest charging stations in the driving city. Since the ground vehicle 10 needs to charge the flight vehicle 20, the capacity of the battery pack of the ground vehicle 10 should exceed 100 kilowatt hours.

In order to avoid the unfolded flight driving device 22 of the flight vehicle 20 from generating resistance or interference when the ground vehicle 10 drives on the road, the flight driving device 22 of the flight vehicle 20 can be retracted or folded in order to meet the requirements of road driving. After the flight vehicle 20 lands on the landing platform 13, the flight driving device 22 is retracted or folded towards the flight vehicle 20 (as shown in FIG. 1), in order to fit the flight vehicle 20 inside the footprint of the ground vehicle 10. When the flight vehicle 20 needs to take off from the landing platform 13, the flight driving device 22 is extended out from the flight vehicle 20 (as shown in FIG. 3), in order to provide the lift force for the flight vehicle 20. For example, the flight vehicle 20 may be provided with a tandem wing with one lift fan per wing to allow excellent controllability of the quad-copter configuration while allowing the wings to simply fold (or sweep) forward and aft along the body to stay within a standard vehicle width when driving.

Specifically, the flight driving device 22 includes a driving motor 221, a rotor 222 and a supporting arm 223. The driving motor 221 is used for driving the rotor 222 to rotate, so as to enable the flight vehicle 20 to realize vertical takeoff and vertical landing. The rotor 222 is mounted on the supporting arm 223, and the supporting arm 223 is connected to the second cabin 21. The quantity of the flight driving device 22 may be multiple, i.e., the flight vehicle 20 may be a multi-rotor aircraft, e.g., having four rotors. Each rotor 222 is equipped with a driving motor 221. Optionally, the flight driving device 22 may have a plurality of rotors and a plurality of fixing wings simultaneously.

The flight vehicle 20 can realize vertical takeoff and landing (VTOL). VTOL requires the aircraft to accelerate air in a downward direction. The fundamental physics model of the actuator disk is useful for estimating specific power requirements.

The ideal power required to hover (not counting propeller inefficiencies or swirl imparted to the flow or extra power needed to climb) is:

$$P = \frac{T^{\frac{3}{2}}}{\sqrt{2A\rho}} \quad \text{equation 1}$$

Where T is the thrust (equal to the gross takeoff weight, GTOW) of the flight vehicle, A is the actuator disk area (or the area swept out by the proprotor), and rho is the air density. Given an assumed air density and disk loading, this relation can be used to determine a minimum specific power allowable for an entire flight vehicle system. In SI units, this relation becomes:

$$\text{Vehicle Specific Power}\left(\frac{W}{kg}\right) \geq 22\sqrt{\text{Disk Loading}\left(\frac{kg}{m^2}\right)} \quad \text{equation 2}$$

Or conversely, a given vehicle specific power can determine a maximum allowable disk loading:

$$\text{Disk Loading}\left(\frac{kg}{m^2}\right) < \frac{\left(\text{Vehicle Specific Power}\left(\frac{W}{kg}\right)\right)^2}{484} \quad \text{equation 3}$$

With this knowledge of the physics and the technical limits of today's battery technology, this simple relation can be used to determine estimates of the minimum propeller size for a given weight of flight vehicle. Although simplistic, this can be used to determine theoretical maximum weights for a given flight vehicle envelope/package size, which is particularly useful due to the geometric constraints of driving on roads.

To estimate vehicle specific power, we must know both the specific power of the battery and the battery mass fraction (the ratio of the battery weight to the gross vehicle weight). Given the experience of the A3 Vahana team, it is reasonable to use their battery mass fraction (~25%) as an initial guess. Therefore, the battery specific power must be reduced by a factor of four to estimate vehicle specific power. The SOA LG Chem cell would therefore enable a vehicle specific power of 338 W/kg necessitating a maximum potential disk loading of 237 kg/m^2. If we then scale the size of the Vahana by a factor of two to account for a doubling of the payload/occupancy, a candidate two place vehicle would have a maximum gross takeoff weight of 1450 kg with a minimum allowable total lift fan size of 6.1 m^2. If this minimum area were to be one rotor, it would be 2.8 meters diameter—which itself is larger than the allowable width of a truck. This suggests that some type of folding of the VTOL flight components may be required in order to stay within one lane once practical efficiencies are taken into account that will increase power and disk size requirements. If we were to restrict our battery choice to the highest specific energy Panasonic cells, the maximum allowable disk loading would only be 27 kg/m^2 necessitating a 54 m^2 (8.3 m diameter) rotor for a 1450 kg flight vehicle. This would likely force a helicopter-like configuration which would have significant range limitations due to the poor L/D (lift-to-drag ratio) and low frequency blade noise that will be less-well attenuated by the atmosphere. This example illustrates why battery specific power is fundamentally important to the flight vehicle.

Even with the best specific power cells available, it is certain that with today's battery technology, the disk area of the flight vehicle will be large compared to a typical car dimension. One could reasonably estimate a minimum of 3 m^2 disk area per person payload with today's battery technology. More disk area per unit payload will reduce the power required to hover and is therefore very desirable.

Equation 1 above represents an ideal (minimum) power required to hover. In practice, there are aerodynamic losses in the prop/rotor that cause the actual shaft power needed to be higher than the theoretical power calculated. These losses are summarized by a hover figure of merit (FM) which is simply a non-dimensional efficiency. In addition, there are required climb, maneuvering, and reserve excess power margins that are typically at least 15%.

$$P_{shaft} = (1 + \text{Margin})\frac{P}{FM_{hover}} = (1 + \text{Margin})\frac{GTOW^{3/2}}{FM_{hover}\sqrt{(2A\rho)}} \quad \text{equation 4}$$

$P_{shaft}$: shaft power
P: theoretical power
Margin: reserve excess power margin
$FM_{hover}$: hover figure of merit
GTOW: gross takeoff weight
A: disk area
rho: the air density Typical hover FMs are in the range of 0.6-0.8 for VTOL aircrafts. These rotor losses noticeably increase the shaft power required.

In addition to the aerodynamic losses, electrical losses in the batteries, motors, wires, and inverters must be included to estimate maximum electrical power. These losses are commonly noted with an electrical efficiency $\eta_e$ that is typically in the range of 0.9.

$$P_{eVTOL} = \frac{P_{shaft}}{\eta_e} = (1 + \text{Margin})\frac{GTOW^{3/2}}{\eta_e FM_{hover}\sqrt{(2A\rho)}} \quad \text{equation 5}$$

$P_{eVTOL}$: actual power required for VTOL
$P_{shaft}$: shaft power
$\eta_e$: electrical efficiency The range of the electric flight vehicle can be calculated with the following equation:

$$\text{Range} = \frac{\eta_p \eta_e \left(\frac{L}{D}\right)(\text{Usable Cruise Energy})}{GTOW} \quad \text{equation 6}$$

Where $\eta_p$ is the propulsive efficiency of the propeller used for forward flight (which is different than the hover FM even if it is the same propeller due to the different operating regime), $\eta_e$ is the efficiency of the electric system in turning the propeller shaft (including all losses from the battery to the shaft power as described in equation 5), $$\left(\frac{L}{D}\right)$$

is the lift-to-drag ratio of the vehicle in cruise flight (the most relevant measure of aircraft platform efficiency), and Usable Cruise Energy is the fraction of the energy stored in the battery that can be reliably used for cruise flying.

Usable Cruise Energy=Available Batt. Energy−
  VTOL Batt. Energy−Reserve Batt. Energy      equation 7

Available Batt. Energy: available battery energy
VTOL Batt. Energy: battery energy in VTOL
Reserve Batt. Energy: reserve battery energy $$\text{Available Batt.Energy} = GTOW\left(\frac{m_{batt}}{m_{GTOW}}\right) \quad \text{equation 8}$$

(Batt.Specific Energy)(Allowable Depth of Discharge)

Batt. Specific Energy: battery specific power
Allowable Depth of Discharge: allowable depth of discharge $$\left(\frac{m_{batt}}{m_{GTOW}}\right):$$

percentage of battery weight accounting for total gross takeoff weight

VTOL Batt. Energy=$P_{eVTOL}t_{hover}$      equation 9

Typical allowable depth of discharge is 90% to avoid potential battery damage.

$$\left(\frac{m_{batt}}{m_{GTOW}}\right)$$

is assumed to be approximately 25%, and SOA battery technology (e.g., the LG Chem cells referenced above) has a specific energy of approximately 200 W-hr/kg.

There are many variables that can affect the hover time, but for our purposes, we will assume that both the climb and transition phase and the descent and landing phase require 45 seconds of hover power each. And that the vehicle must be capable of an aborted landing followed by a successful landing—requiring a total of 4*45=180 seconds of hover time.

$$\text{VTOL Batt.Energy} = t_{hover}(1+\text{Margin})\frac{GTOW^{3/2}}{\eta_e FM_{hover}\sqrt{(2A\rho)}} \quad \text{equation 10}$$

Note that this amount of energy is proportional to the GTOW to the 3/2 power, so extra weight is particularly penalizing to VTOL battery energy required.

The reserve battery energy is determined by the FAA mandated minimum reserves for VTOL VFR (visual flight rules) flight of 20 minutes. This time is multiplied by the cruise power consumption.

$$\text{Reserve Batt.Energy} = t_{reserve}P_{e_{cruise}} = t_{reserve}\frac{GTOW\ V_c}{\eta_p\eta_e(L/D)} \quad \text{equation 11}$$

-continued $$P_{e_{cruise}} = \frac{GTOW\ V_c}{\eta_p\eta_e(L/D)} \quad \text{equation 12}$$

Where $P_{e_{cruise}}$ is the electric power consumed during cruise flight, and $V_c$ is the cruise speed of the aircraft. Note that the three efficiencies of the range equation show up again here. Maximizing those efficiencies is key to making the flight vehicle have a practical range.

This first principles analysis is used to guide conceptual design of the flight vehicle. The equations above can be used to evaluate the effect of parametric changes on the range of a VTOL flight vehicle. In particular, the appropriate disk loading and the lift-to-drag ratio are important parameters to help evaluate the feasibility of the flight vehicle concept with today's battery technology.

These parameters of L/D and disk area drive much of the basic geometry of the flight vehicle: disk area determines the size of the VTOL proprotors and lift-to-drag ratio is proportional to the wingspan divided by the square root of the wetted area, both of which are major drivers of the basic geometry.

However, there is a good case for proceeding with development of a very high L/D VTOL folding aircraft for flight vehicle for at least two reasons. First improvements in battery technology will dramatically reduce requirements on L/D in the future. In addition, it is possible that the 20 minute VFR reserve could be dramatically reduced for electric VTOL aircraft. This could also help dramatically reduce the necessary L/D.

It is extremely difficult to execute precision landings in real-world conditions with gusts and unstable air. The vehicle dynamic control system will need to respond to these perturbations with sufficient control margin to allow the flight vehicle to land on the ground vehicle in all but the most extreme conditions. While the flight vehicle should always have the ability to land off of the vehicle (on the ground) in off-nominal operations, those operations should be extremely rare. We have recommended that the flight vehicle should be capable of conducting a precision landing on the ground vehicle in 30 kt winds with gusts to 45 kts. Conditions worse than these are rare in most locations, and as such, it should be possible to avoid ground-landings most of the time. For those times when a landing on the ground is necessary, the ground vehicle will need to have the capability of loading the flight vehicle onto it (like a flatbed tow truck).

The ground vehicle will need to be capable of conducting an assessment of a potential VTOL operations location. This determination could be made through the use of the ground vehicle's on-board LIDAR system to map out surrounding obstacles and wires that could pose a hazard to VTOL operations. In addition, the flight vehicle operator should be required to conduct a visual assessment of the landing area to ensure that he/she agrees with the assessment of the automation. The ground vehicle AI should continuously learn from this operator teaching and it should become better at making site assessment with time.

In an embodiment, the flight vehicle 20 has a cruise speed greater than 185 km/hr (100 kts), a minimum range of 93 km (50 nautical miles), a noise signature less than 67 dB at a distance of 250 feet altitude, a minimum payload of 100 kg (one occupant), and preferably with a minimum payload of 200 kg (two occupants). The flight vehicle 20 has the ability to land on the ground vehicle 10 in 30 kt winds with gusts to 45 kts. The flight vehicle 20 has a disk area of 25 m^2 and a L/D of 16.

Figure 16:
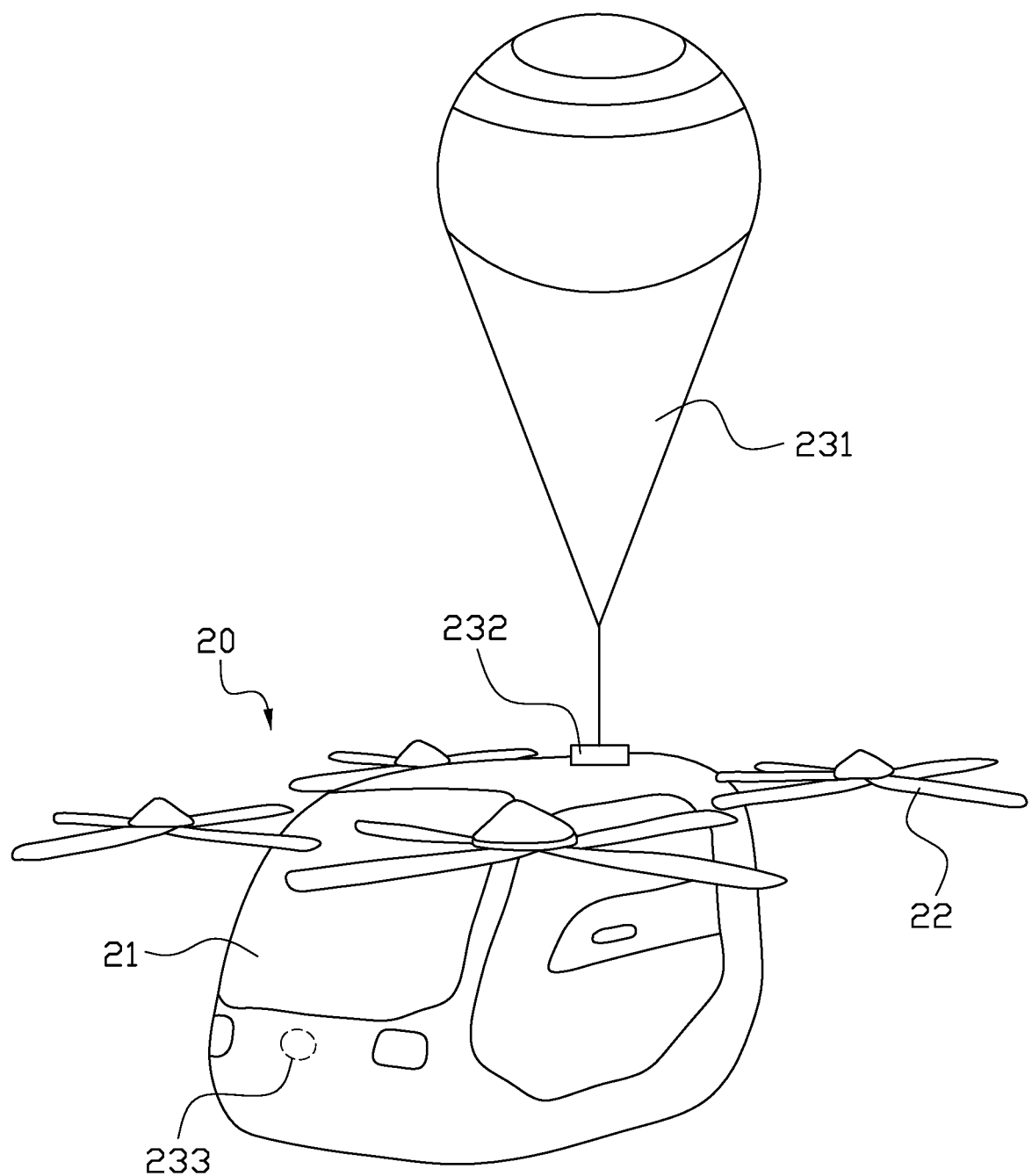
FIG. 16 is a schematic view of the flight vehicle according to another embodiment of the present application.
Figure 17:
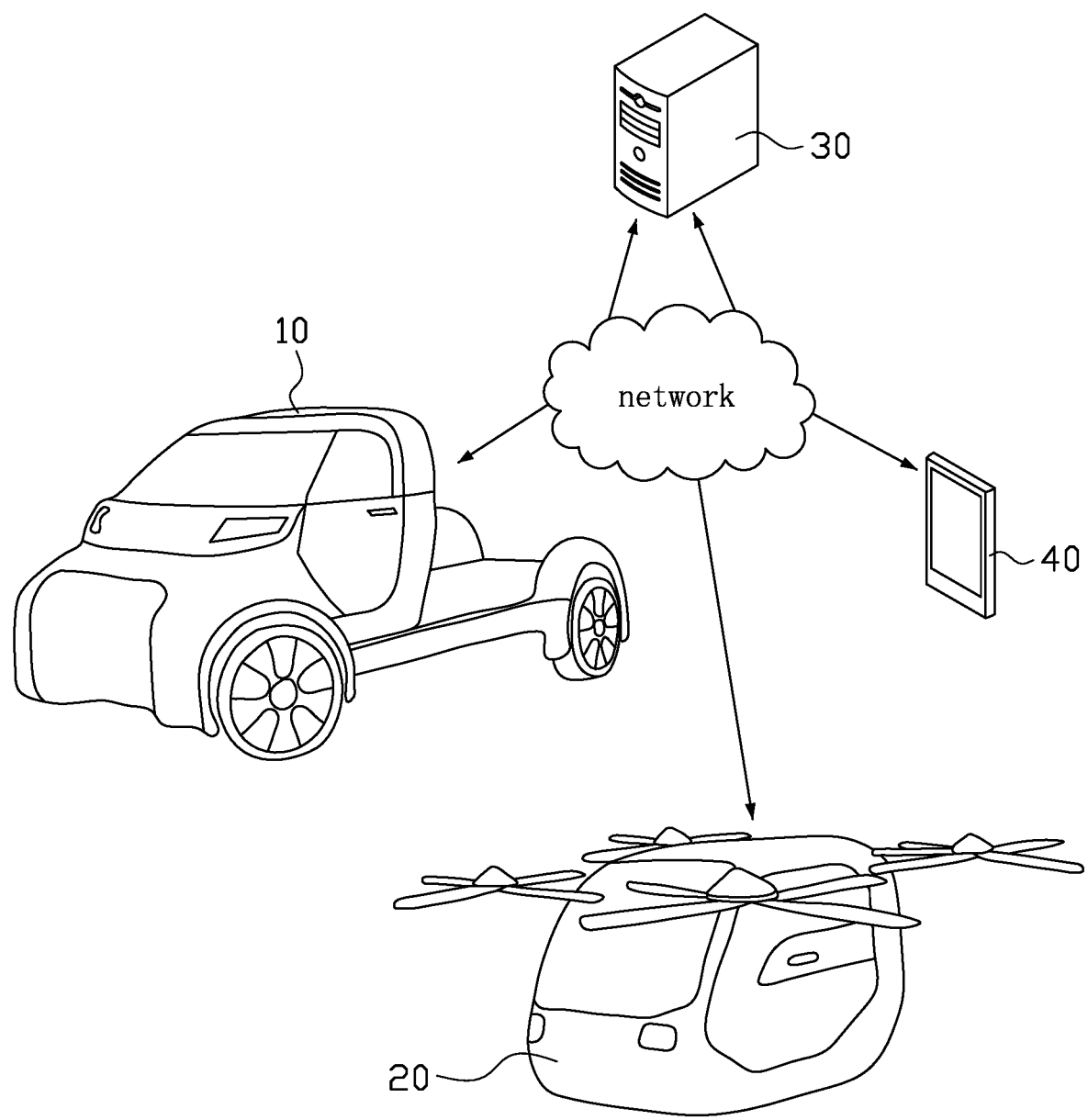
FIG. 17 is a schematic view of a flying car system according to an embodiment of the present application.
Figure 18:
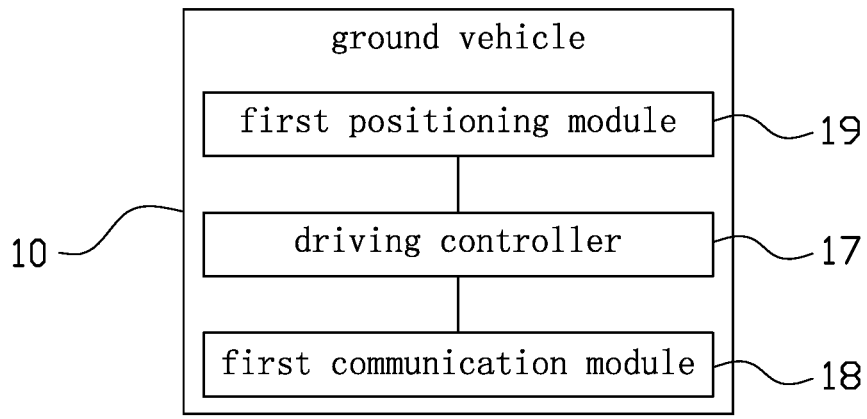
FIG. 18 is a block diagram of the ground vehicle according to an embodiment of the present application.
Figure 19:
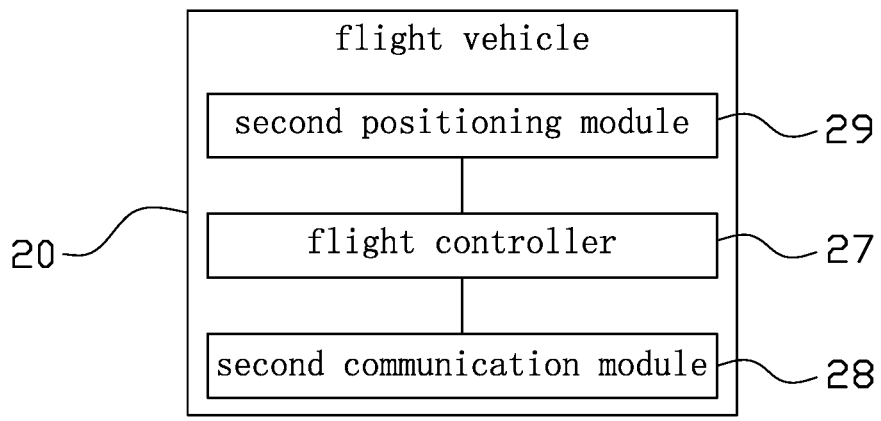
FIG. 19 is a block diagram of the flight vehicle according to an embodiment of the present application.
Figure 20:
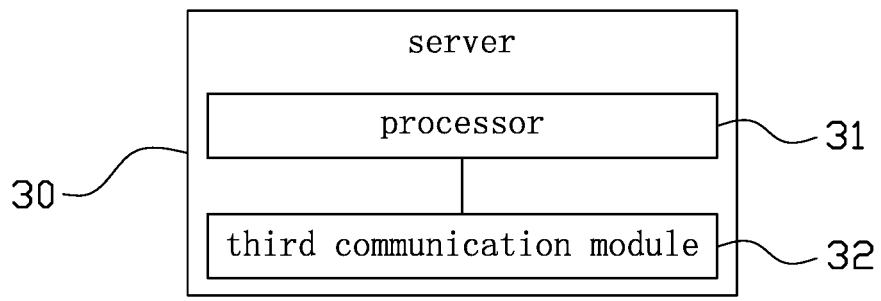
FIG. 20 is a block diagram of the server according to an embodiment of the present application.

Referring to FIG. 16, the flight vehicle 20 further includes a parachute system by which safe landing is possible in case of emergency, such as loss of power. The parachute system includes a parachute 231, a parachute housing 232 and an emergency button 233. The parachute housing 232 is formed in the flight vehicle 20, and the parachute 231 is received in the parachute housing 232. The emergency button 233 is used to control the parachute 231 to open. When the flight vehicle 20 is in emergency situations such as falling, the occupants can press the emergency button 233 to open the parachute housing 232 and release the parachute 231, to prevent the flight vehicle 20 from falling and improve the safety of flight.

Further, the flight vehicle 20 can land directly onto the ground in an emergency, and the flight vehicle 20 can be picked up by the ground vehicle 10 to the landing platform 13. That is, the ground vehicle 10 can lift the flight vehicle 20 from the ground and load it to the landing platform 13.

Second Embodiment

Referring to FIGS. 17-20, a flying car system is provided in a second embodiment of the present application. The flying car system includes a ground vehicle 10, a flight vehicle 20 and a server 30. The structures about the ground vehicle 10 and the flight vehicle 20 can refer to the above first embodiment, and are omitted herein for clarity.

The ground vehicle 10 further includes a driving controller 17 and a first communication module 18. The first communication module 18 is connected with the driving controller 17. The flight vehicle 20 further includes a flight controller 27 and a second communication module 28. The second communication module 28 is connected with the flight controller 27. The server 30 includes a processor 31 and a third communication module 32. The third communication module 32 is connected with the processor 31.

The ground vehicle 10 and the server 30 are communicated with each other wirelessly via the first communication module 18 and the third communication module 32. The flight vehicle 20 and the server 30 are communicated with each other wirelessly via the second communication module 28 and the third communication module 32. Particularly, a wireless communication connection between the first communication module 18 and the third communication module 32, and between the second communication module 28 and the third communication module 32, can be realized through 2G, 3G, 4G, GPRS and other wireless networks.

The ground vehicle 10 further includes a first positioning module 19. The first positioning module 19 is connected with the driving controller 17. The first positioning module 19 is used for acquiring the position information of the ground vehicle 10, and the position information of the ground vehicle 10 may be sent to the server 30 through the first communication module 18. After receiving the position information of the ground vehicle 10, the server 30 may further send the position information of the ground vehicle 10 to the flight vehicle 20 and/or a terminal 40 through the third communication module 32.

The flight vehicle 20 further includes a second positioning module 29. The second positioning module 29 is connected with the flight controller 27. The second positioning module 29 is used for acquiring the position information of the flight vehicle 20, and the position information of the flight vehicle 20 may be sent to the server 30 through the second communication module 28. After receiving the position information of the flight vehicle 20, the server 30 may further send the position information of the flight vehicle 20 to the ground vehicle 10 and/or the terminal 40 through the third communication module 32.

The ground vehicle 10 and the flight vehicle 20 above can be shared under the premise of payment. A user can communicate with the server 30 using the terminal 40 to realize calling the ground vehicle 10 and the flight vehicle 20. In use, the user can transfer between the ground vehicle 10 and the flight vehicle 20. After use, the user can return the ground vehicle 10 and the flight vehicle 20 while paying certain fees. Hereinafter, several scenarios of use are given for example.

Scenario one: at the starting point A, the user can send a call request for calling a ground vehicle 10 to the server 30 through the terminal 40, the server 30 allocates a ground vehicle 10 for the user according to the call request, so that the user can travel by the ground vehicle 10. After reaching the destination C, the user can send a return request for returning the ground vehicle 10 to the server 30 through the terminal 40 while paying the fees for the use of the ground vehicle 10, so that the ground vehicle 10 is returned back to the lessor.

Scenario two: at the starting point A, the user can send a call request for calling a ground vehicle 10 to the server 30 through the terminal 40, the server 30 allocates a ground vehicle 10 for the user according to the call request, so that the user can travel by the ground vehicle 10. When reaching the midway B, if there is a traffic jam or a bad road condition, the user can send a call request for calling a flight vehicle 20 to the server 30 through the terminal 40, the server 30 allocates a flight vehicle 20 for the user according to the call request, the flight vehicle 20 flies above and lands on the landing platform 13 of the ground vehicle 10, so that the user can transfer from the ground vehicle 10 to the flight vehicle 20 and continue to travel by the flight vehicle 20. After transferring to the flight vehicle 20, the user can send a return request for returning the ground vehicle 10 to the server 30 through the terminal 40 while paying the fees for the use of the ground vehicle 10, so that the ground vehicle 10 is returned back to the lessor. After reaching the destination C, the user can send a return request for returning the flight vehicle 20 to the server 30 through the terminal 40 while paying the fees for the use of the flight vehicle 20, so that the flight vehicle 20 is returned back to the lessor.

Scenario three: at the starting point A, the user can send a call request for calling a flight vehicle 20 to the server 30 through the terminal 40, the server 30 allocates a flight vehicle 20 for the user according to the call request, so that the user can travel by the flight vehicle 20. After reaching the destination C, the user can send a return request for returning the flight vehicle 20 to the server 30 through the terminal 40 while paying the fees for the use of the flight vehicle 20, so that the flight vehicle 20 is returned back to the lessor.

Scenario four: at the starting point A, the user can send a call request for calling a flight vehicle 20 to the server 30 through the terminal 40, the server 30 allocates a flight vehicle 20 for the user according to the call request, so that the user can travel by the flight vehicle 20. When reaching the midway B, if the road condition becomes better and no traffic jam, the user can send a call request for calling a ground vehicle 10 to the server 30 through the terminal 40, the server 30 allocates a ground vehicle 10 for the user according to the call request, the flight vehicle 20 lands on the landing platform 13 of the ground vehicle 10, so that the user can transfer from the flight vehicle 20 to the ground vehicle 10 and continue to travel by the ground vehicle 10. After transferring to the ground vehicle 10, the user can send a return request for returning the flight vehicle 20 to the server 30 through the terminal 40 while paying the fees for the use of the flight vehicle 20, so that the flight vehicle 20 is returned back to the lessor. After reaching the destination C, the user can send a return request for returning the ground vehicle 10 to the server 30 through the terminal 40 while paying the fees for the use of the ground vehicle 10, so that the ground vehicle 10 is returned back to the lessor.

Scenario five: at the starting point A, the user can directly lease a ground vehicle 10 from the lessor and travel by the ground vehicle 10. When reaching the midway B, if there is a traffic jam or a bad road condition, the user can send a call request for calling a flight vehicle 20 to the server 30 through the terminal 40, the server 30 allocates a flight vehicle 20 for the user according to the call request, the flight vehicle 20 flies above and lands on the landing platform 13 of the ground vehicle 10, so that the user can transfer from the ground vehicle 10 to the flight vehicle 20 and continue to travel by the flight vehicle 20. After transferring to the flight vehicle 20, the user can send a return request for returning the ground vehicle 10 to the server 30 through the terminal 40 while paying the fees for the use of the ground vehicle 10, so that the ground vehicle 10 is returned back to the lessor. After reaching the destination C, the user can send a return request for returning the flight vehicle 20 to the server 30 through the terminal 40 while paying the fees for the use of the flight vehicle 20, so that the flight vehicle 20 is returned back to the lessor.

Scenario six: at the starting point A, the user can directly lease a flight vehicle 20 from the lessor and travel by the flight vehicle 20. When reaching the midway B, if the road condition becomes better and no traffic jam, the user can send a call request for calling a ground vehicle 10 to the server 30 through the terminal 40, the server 30 allocates a ground vehicle 10 for the user according to the call request, the flight vehicle 20 lands on the landing platform 13 of the ground vehicle 10, so that the user can transfer from the flight vehicle 20 to the ground vehicle 10 and continue to travel by the ground vehicle 10. After transferring to the ground vehicle 10, the user can send a return request for returning the flight vehicle 20 to the server 30 through the terminal 40 while paying the fees for the use of the flight vehicle 20, so that the flight vehicle 20 is returned back to the lessor. After reaching the destination C, the user can send a return request for returning the ground vehicle 10 to the server 30 through the terminal 40 while paying the fees for the use of the ground vehicle 10, so that the ground vehicle 10 is returned back to the lessor.

According to the actual needs, the user can flexibly select the travel mode by the ground vehicle 10 or by the flight vehicle 20. For example, the user can firstly travel by a ground vehicle 10, then transfer to a flight vehicle 20, later transfer to a ground vehicle 10, and finally transfer to a flight vehicle 20 to reach the destination.

Third Embodiment

A flying car sharing method is provided in a third embodiment of the present application. The method includes:

S101: the terminal 40 sends a first call request for calling a ground vehicle 10 to the server 30, and the terminal 40 sends a first position information to the server 30;

Specifically, the terminal 40 may be a smart phone, a tablet computer, a wearable device, or other electronic devices. On the terminal 40, a client (i.e., an application) for leasing the ground vehicle 10 and the flight vehicle 20 can be installed in advance, so that the user can send a call request for calling ground vehicle 10 or flight vehicle 20 to the server 30 by using the client.

When the user needs to travel, if the road condition is good, priority can be made to travel by a ground vehicle 10, in order to reduce travel costs. Therefore, the user can send a first call request for calling a ground vehicle 10 to the server 30 through the terminal 40, and meanwhile, a first position information is also sent to the server 30 by the terminal 40, wherein the first position information may be the location of the user when the terminal 40 sends the first call request to the server 30, or a specific location that is specified by the user when the terminal 40 sends the first call request to the server 30.

S103: the server 30 allocates an available ground vehicle 10 for the user according to the first call request;

Specifically, after receiving the first call request, the server 30 allocates an available ground vehicle 10 for the user according to the first call request. In the first call request, the user can specify the performance requirements of the called ground vehicle 10, such as the discharge capacity, single row of seats or two rows of seats, etc., so that the server 30 can allocate a ground vehicle 10 that is suitable for the user according to the first call request.

Further, according to the received first position information, the server 30 may allocate an available ground vehicle 10 for the user from the ground vehicle parking lot which is nearest to the first position when allocating a ground vehicle 10 for the user, in order to improve the operating efficiency, reduce the running cost, and save the time for the user to wait.

S105: the server 30 sends the first position information to the allocated ground vehicle 10;

S107: the allocated ground vehicle 10 moves to the first position according to the first position information, so that the user can travel by the ground vehicle 10.

Specifically, after allocating an available ground vehicle 10 for the user, the server 30 sends the received first position information to the allocated ground vehicle 10, so that the allocated ground vehicle 10 can move to the first position according to the first position information.

Preferably, the allocated ground vehicle 10 is able to drive autonomously, or optionally, is able to drive autonomously and manually. After the allocated ground vehicle 10 receives the first position information, the driving controller 17 can generate a navigation route automatically according to the first position information, and control the ground vehicle 10 to drive autonomously to the first position along the navigation route. Further, when the user travels by the ground vehicle 10, the user only needs to input the desired destination, the ground vehicle 10 can drive autonomously, and the user does not need to manually control the ground vehicle 10, which is very convenient.

Since the ground vehicle 10 has the first positioning module 19, the first positioning module 19 can acquire the position information of the ground vehicle 10 in real time, and the position information of the ground vehicle 10 is sent to the server 30 in real time through the first communication module 18. Therefore, in the course of the ground vehicle 10 moving to the first position, the ground vehicle 10 can send its position information to the server 30 through the first communication module 18. After the server 30 receives the position information of the ground vehicle 10, the server 30 sends the position information of the ground vehicle 10 to the terminal 40, so that after calling a ground vehicle 10, the user can know the current position of the allocated ground vehicle 10 at any time through the terminal 40.

After the user reaches a destination by taking the ground vehicle 10, the user can return the ground vehicle 10. Therefore, the method may further include:

S109: the terminal 40 sends a return request for returning the ground vehicle 10 to the server 30;

S111: the server 30 selects a ground vehicle parking lot for returning the ground vehicle 10 according to the return request and the current position information of the ground vehicle 10, and the server 30 sends the location information of the ground vehicle parking lot to the ground vehicle 10;

S113: the ground vehicle 10 returns back to the selected ground vehicle parking lot according to the location information of the ground vehicle parking lot.

Specifically, after the user arrives at desitination the destination by the ground vehicle 10, the user can send a return request for returning the ground vehicle 10 to the server 30 through the terminal 40. Since the ground vehicle 10 has the first positioning module 19, the first positioning module 19 can acquire the position information of the ground vehicle 10 in real time, and the position information of the ground vehicle 10 is sent to the server 30 in real time through the first communication module 18. Therefore, the server 30 can select a ground vehicle parking lot for returning the ground vehicle 10 according to the return request and the current position information of the ground vehicle 10. For example, the server 30 can select a ground vehicle parking lot which is nearest to the ground vehicle 10 for returning the ground vehicle 10, and send the location information of the ground vehicle parking lot to the ground vehicle 10, so that the ground vehicle 10 can return to the selected ground vehicle parking lot according to the location information of the ground vehicle parking lot.

Generally, the lessor who runs the lease business of the ground vehicle 10 will set up a plurality of ground vehicle parking lots at various different locations throughout the country. When the user reaches a destination after travelling a long distance by the ground vehicle 10, the ground vehicle 10 can be returned to the nearest ground vehicle parking lot to the user when returing, so that the ground vehicle 10 can be returned to the nearby ground vehicle parking lot conveniently, and the ground vehicle 10 does not need to drive back to the original ground vehicle parking lot, thereby improving the operation efficiency.

Fourth Embodiment

A flying car sharing method is provided in a fourth embodiment of the present application. The method includes:

S201: the terminal 40 sends a first call request for calling a ground vehicle 10 to the server 30, and the terminal 40 sends a first position information to the server 30;

S203: the server 30 allocates an available ground vehicle 10 for the user according to the first call request;

S205: the server 30 sends the first position information to the allocated ground vehicle 10;

S207: the allocated ground vehicle 10 moves to the first position according to the first position information, so that the user can travel by the ground vehicle 10;

The above steps of S201, S203, S205, S207 can respectively refer to the above steps of S101, S103, S105 and S107 for more details, and are herein omitted for clarity.

S209: the terminal 40 sends a second call request for calling a flight vehicle 20 to the server 30, and the terminal 40 sends a second position information to the server 30;

Specifically, when the user reaches midway by the ground vehicle 10, if there is a traffic jam or a bad road condition, the user can send a second call request for calling a flight vehicle 20 to the server 30 through the terminal 40, and meanwhile, a second position information is also sent to the server 30 by the terminal 40, wherein the second position information may be the location of the user when the terminal 40 sends the second call request to the server 30, or a specific location that is specified by the user when the terminal 40 sends the second call request to the server 30.

S211: the server 30 allocates an available flight vehicle 20 for the user according to the second call request;

Specifically, after receiving the second call request, the server 30 allocates an available flight vehicle 20 for the user according to the second call request. In the second call request, the user can specify the performance requirements of the called flight vehicle 20, such as the flying speed, single row of seats or two rows of seats, etc., so that the server 30 can allocate a flight vehicle 20 that is suitable for the user according to the second call request.

Further, according to the received second position information, the server 30 may allocate an available flight vehicle 20 for the user from the flight vehicle parking lot which is nearest to the second position when allocating a flight vehicle 20 for the user, in order to improve the operating efficiency, reduce the running cost, and save the time for the user to wait.

S213: the server 30 sends the second position information to the allocated flight vehicle 20;

S215: the allocated flight vehicle 20 flies to the second position according to the second position information, and the flight vehicle 20 lands on the landing platform 13 of the ground vehicle 10, so that the user can transfer from the ground vehicle 10 to the flight vehicle 20 and continue to travel by the flight vehicle 20.

Specifically, after allocating an available flight vehicle 20 for the user, the server 30 sends the received second position information to the allocated flight vehicle 20, so that the allocated flight vehicle 20 can fly to the second position according to the second position information. After the flight vehicle 20 flies above the ground vehicle 10, the flight vehicle 20 lands on the landing platform 13 of the ground vehicle 10, so that the user can transfer from the ground vehicle 10 to the flight vehicle 20 and continue to travel by the flight vehicle 20.

Since the ground vehicle 10 has the first positioning module 19, the first positioning module 19 can acquire the position information of the ground vehicle 10 in real time, and the position information of the ground vehicle 10 is sent to the server 30 in real time through the first communication module 18. In order to ensure that the flight vehicle 20 can find the ground vehicle 10 accurately, the position information of the ground vehicle 10 is continually sent to the flight vehicle 20 in real time through the server 30. As such, even if the ground vehicle 10 has moved to a new position different from the second position after the terminal 40 sends the second call request to the server 30, the flight vehicle 20 can also accurately find the ground vehicle 10 according to the current position of the ground vehicle 10.

Preferably, the allocated flight vehicle 20 is able to drive autonomously, or optionally, is able to drive autonomously and manually. After the flight vehicle 20 receives the second position information, the flight controller 27 can generate a navigation route automatically according to the second position information, and control the flight vehicle 20 to drive autonomously to the second position along the navigation route. Further, when the user travels by the flight vehicle 20, the user only needs to input the desired destination, the flight vehicle 20 can fly autonomously, and the user does not need to manually control the flight vehicle 20, which is very convenient.

Since the flight vehicle 20 has the second positioning module 29, the second positioning module 29 can acquire the position information of the flight vehicle 20 in real time, and the position information of the flight vehicle 20 is sent to the server 30 in real time through the second communication module 28. Therefore, in the course of the flight vehicle 20 flying to the second position, the flight vehicle 20 can send its position information to the server 30 through the second communication module 28. After the server 30 receives the position information of the flight vehicle 20, the server 30 sends the position information of the flight vehicle 20 to the terminal 40, so that after calling a flight vehicle 20, the user can know the current position of the allocated flight vehicle 20 at any time through the terminal 40.

After the user transfers from the ground vehicle 10 to the flight vehicle 20, the ground vehicle 10 is in an idle state, and the user can choose to return the ground vehicle 10 first. Therefore, the method may further include:

S217: the terminal 40 sends a return request for returning the ground vehicle 10 to the server 30;

S219: the server 30 selects a ground vehicle parking lot for returning the ground vehicle 10 according to the return request and the current position information of the ground vehicle 10, and the server 30 sends the location information of the ground vehicle parking lot to the ground vehicle 10;

S221: the ground vehicle 10 returns back to the selected ground vehicle parking lot according to the location information of the ground vehicle parking lot.

The above steps of S217, S219 and S221 can respectively refer to the above steps of S109, S111 and S113 for more details, and are herein omitted for clarity.

After the user reaches a destination by taking the flight vehicle 20, the user can return the flight vehicle 20. Therefore, the method may further include:

S223: the terminal 40 sends a return request for returning the flight vehicle 20 to the server 30;

S225: the server 30 selects a flight vehicle parking lot for returning the flight vehicle 20 according to the return request and the current position information of the flight vehicle 20, and the server 30 sends the location information of the flight vehicle parking lot to the flight vehicle 20;

S227: the flight vehicle 20 returns back to the selected flight vehicle parking lot according to the location information of the flight vehicle parking lot.

Specifically, after the user arrives at dcsitination the destination by the flight vehicle 20, the user can send a return request for returning the flight vehicle 20 to the server 30 through the terminal 40. Since the flight vehicle 20 has the second positioning module 29, the second positioning module 29 can acquire the position information of the flight vehicle 20 in real time, and the position information of the flight vehicle 20 is sent to the server 30 in real time through the second communication module 28. Therefore, the server 30 can select a flight vehicle parking lot for returning the flight vehicle 20 according to the return request and the current position information of the flight vehicle 20. For example, the server 30 can select a flight vehicle parking lot which is nearest to the flight vehicle 20 for returning the flight vehicle 20, and send the location information of the flight vehicle parking lot to the flight vehicle 20, so that the flight vehicle 20 can return to the selected flight vehicle parking lot according to the location information of the flight vehicle parking lot.

Generally, the lessor who runs the lease business of the flight vehicle 20 will set up a plurality of flight vehicle parking lots at various different locations throughout the country. When the user reaches a destination after travelling a long distance by the flight vehicle 20, the flight vehicle 20 can be returned to the nearest flight vehicle parking lot to the user when returning, so that the flight vehicle 20 can be returned to the nearby flight vehicle parking lot conveniently, and the flight vehicle 20 does not need to fly back to the original flight vehicle parking lot, thereby improving the operation efficiency.

Fifth Embodiment

A flying car sharing method is provided in a fifth embodiment of the present application. The method includes:

S301: the terminal 40 sends a first call request for calling a flight vehicle 20 to the server 30, and the terminal 40 sends a first position information to the server 30;

Specifically, the terminal 40 may be a smart phone, a tablet computer, a wearable device, or other electronic devices. On the terminal 40, a client (i.e., an application) for leasing the ground vehicle 10 and the flight vehicle 20 can be installed in advance, so that the user can send a call request for calling flight vehicle 20 or ground vehicle 10 to the server 30 by using the client.

When the user needs to travel, if the road condition is not good, priority can be made to travel by a flight vehicle 20. Therefore, the user can send a first call request for calling a flight vehicle 20 to the server 30 through the terminal 40, and meanwhile, a first position information is also sent to the server 30 by the terminal 40, wherein the first position information may be the location of the user when the terminal 40 sends the first call request to the server 30, or a specific location that is specified by the user when the terminal 40 sends the first call request to the server 30.

S303: the server 30 allocates an available flight vehicle 20 for the user according to the first call request;

Specifically, after receiving the first call request, the server 30 allocates an available flight vehicle 20 for the user according to the first call request. In the first call request, the user can specify the performance requirements of the called flight vehicle 20, such as the flying speed, single row of seats or two rows of seats, etc., so that the server 30 can allocate a flight vehicle 20 that is suitable for the user according to the first call request.

S305: the server 30 sends the first position information to the allocated flight vehicle 20;

S307: the allocated flight vehicle 20 flies to the first position according to the first position information, so that the user can travel by the flight vehicle 20.

Specifically, after allocating an available flight vehicle 20 for the user, the server 30 sends the received first position information to the allocated flight vehicle 20, so that the allocated ground vehicle 10 can fly to the first position according to the first position information.

Preferably, the allocated flight vehicle 20 is able to drive autonomously, or optionally, is able to drive autonomously and manually. After the flight vehicle 20 receives the first position information, the flight controller 27 can generate a navigation route automatically according to the first position information, and control the flight vehicle 20 to drive autonomously to the first position along the navigation route. Further, when the user travels by the flight vehicle 20, the user only needs to input the desired destination, the flight vehicle 20 can fly autonomously, and the user does not need to manually control the flight vehicle 20, which is very convenient.

Since the flight vehicle 20 has the second positioning module 29, the second positioning module 29 can acquire the position information of the flight vehicle 20 in real time, and the position information of the flight vehicle 20 is sent to the server 30 in real time through the second communication module 28. Therefore, in the course of the flight vehicle 20 flying to the first position, the flight vehicle 20 can send its position information to the server 30 through the second communication module 28. After the server 30 receives the position information of the flight vehicle 20, the server 30 sends the position information of the flight vehicle 20 to the terminal 40, so that after calling a flight vehicle 20, the user can know the current position of the allocated flight vehicle 20 at any time through the terminal 40.

After the user reaches a destination by taking the flight vehicle 20, the user can return the flight vehicle 20. Therefore, the method may further include:

S309: the terminal 40 sends a return request for returning the flight vehicle 20 to the server 30;

S311: the server 30 selects a flight vehicle parking lot for returning the flight vehicle 20 according to the return request and the current position information of the flight vehicle 20, and the server 30 sends the location information of the flight vehicle parking lot to the flight vehicle 20;

S313: the flight vehicle 20 returns back to the selected flight vehicle parking lot according to the location information of the flight vehicle parking lot.

The above steps of S309, S311, S313 can respectively refer to the above steps of S223, S225, S227 for more details, and are herein omitted for clarity.

Sixth Embodiment

A flying car sharing method is provided in a sixth embodiment of the present application. The method includes:

S401: the terminal 40 sends a first call request for calling a flight vehicle 20 to the server 30, and the terminal 40 sends a first position information to the server 30;

S403: the server 30 allocates an available flight vehicle 20 for the user according to the first call request;

S405: the server 30 sends the first position information to the allocated flight vehicle 20;

S407: the allocated flight vehicle 20 flies to the first position according to the first position information, so that the user can travel by the flight vehicle 20;

The above steps of S401, S403, S405, S407 can respectively refer to the above steps of S301, S303, S305, S307 for more details, and are herein omitted for clarity.

S409: the terminal 40 sends a second call request for calling a ground vehicle 10 to the server 30, and the terminal 40 sends a second position information to the server 30;

Specifically, after the user flies for a period of time by the flight vehicle 20, if the road condition becomes good and there is no traffic jam, the user can send a second call request for calling a ground vehicle 10 to the server 30 through the terminal 40, and meanwhile, a second position information is also sent to the server 30 by the terminal 40, wherein the second position information may be the location of the user when the terminal 40 sends the second call request to the server 30, or a specific location that is specified by the user when the terminal 40 sends the second call request to the server 30.

S411: the server 30 allocates an available ground vehicle 10 for the user according to the second call request;

Specifically, after receiving the second call request, the server 30 allocates an available ground vehicle 10 for the user according to the second call request. In the second call request, the user can specify the performance requirements of the called ground vehicle 10, such as the discharge capacity, single row of seats or two rows of seats, etc., so that the server 30 can allocate a ground vehicle 10 that is suitable for the user according to the second call request.

S413: the server 30 sends the second position information to the allocated ground vehicle 10;

S415: the allocated ground vehicle 10 moves to the second position according to the second position information, and the flight vehicle 20 lands on the landing platform 13 of the ground vehicle 10, so that the user can transfer from the flight vehicle 20 to the ground vehicle 10 and continue to travel by the ground vehicle 10.

Specifically, after allocating an available ground vehicle 10 for the user, the server 30 sends the received second position information to the allocated ground vehicle 10, so that the allocated ground vehicle 10 can move to the second position according to the second position information. After the ground vehicle 10 has come to the second position, the flight vehicle 20 lands on the landing platform 13 of the ground vehicle 10, so that the user can transfer from the flight vehicle 20 to the ground vehicle 10 and continue to travel by the ground vehicle 10.

Since the flight vehicle 20 has the second positioning module 29, the second positioning module 29 can acquire the position information of the flight vehicle 20 in real time, and the position information of the flight vehicle 20 is sent to the server 30 in real time through the second communication module 28. In order to ensure that the ground vehicle 10 can find the flight vehicle 20 accurately, the position information of the flight vehicle 20 is continually sent to the ground vehicle 10 in real time through the server 30. As such, even if the flight vehicle 20 has moved to a new position different from the second position after the terminal 40 sends the second call request to the server 30, the ground vehicle 10 can also accurately find the flight vehicle 20 according to the current position of the flight vehicle 20.

After the user transfers from the flight vehicle 20 to the ground vehicle 10, the flight vehicle 20 is in an idle state, and the user can choose to return the flight vehicle 20 first. Therefore, the method may further include:

S417: the terminal 40 sends a return request for returning the flight vehicle 20 to the server 30;

S419: the server 30 selects a flight vehicle parking lot for returning the flight vehicle 20 according to the return request and the current position information of the flight vehicle 20, and the server 30 sends the location information of the flight vehicle parking lot to the flight vehicle 20;

S421: the flight vehicle 20 returns back to the selected flight vehicle parking lot according to the location information of the flight vehicle parking lot.

The above steps of S417, S419, S421 can respectively refer to the above steps of S223, S225, S227 for more details, and are herein omitted for clarity.

After the user reaches a destination by taking the ground vehicle 10, the user can return the ground vehicle 10. Therefore, the method may further include:

S423: the terminal 40 sends a return request for returning the ground vehicle 10 to the server 30;

S425: the server 30 selects a ground vehicle parking lot for returning the ground vehicle 10 according to the return request and the current position information of the ground vehicle 10, and the server 30 sends the location information of the ground vehicle parking lot to the ground vehicle 10;

S427: the ground vehicle 10 returns back to the selected ground vehicle parking lot according to the location information of the ground vehicle parking lot.

The above steps of S423, S425, S427 can respectively refer to the above steps of S109, S111, S113 for more details, and are herein omitted for clarity.

Seventh Embodiment

A flying car sharing method is provided in a seventh embodiment of the present application. The method includes:

S501: the user takes a ground vehicle 10 to travel at a first position;

Specifically, when the user owns a ground vehicle 10, the user can take his/her own ground vehicle 10 to travel, wherein the first position is the parking place of the ground vehicle 10 of the user.

Alternatively, the ground vehicle 10 may also be shared under the premise of payment. As such, the user can directly go to a nearest ground vehicle parking lot to lease a ground vehicle 10 from the lessor, wherein the first position is the ground vehicle parking lot for parking the ground vehicle 10.

S503: the terminal 40 sends a call request for calling a flight vehicle 20 to the server 30, and the terminal 40 sends a second position information to the server 30;

Specifically, when the user reaches midway by the ground vehicle 10, if there is a traffic jam or a bad road condition, the user can send a call request for calling a flight vehicle 20 to the server 30 through the terminal 40, and meanwhile, a second position information is also sent to the server 30 by the terminal 40, wherein the second position information may be the location of the user when the terminal 40 sends the call request to the server 30, or a specific location that is specified by the user when the terminal 40 sends the call request to the server 30.

S505: the server 30 allocates an available flight vehicle 20 for the user according to the call request;

S507: the server 30 sends the second position information to the allocated flight vehicle 20;

S509: the allocated flight vehicle 20 flies to the second position according to the second position information, and the flight vehicle 20 lands on the landing platform 13 of the ground vehicle 10, so that the user can transfer from the ground vehicle 10 to the flight vehicle 20 and continue to travel by the flight vehicle 20.

The above steps of S505, S507, S509 can respectively refer to the above steps of S211, S213, S215 for more details, and are herein omitted for clarity.

After the user transfers from the ground vehicle 10 to the flight vehicle 20, the ground vehicle 10 is in an idle state. If the ground vehicle 10 is shared under payment, the user can choose to return the ground vehicle 10 first. Therefore, the method may further include:

S511: the terminal 40 sends a return request for returning the ground vehicle 10 to the server 30;

S513: the server 30 selects a ground vehicle parking lot for returning the ground vehicle 10 according to the return request and the current position information of the ground vehicle 10, and the server 30 sends the location information of the ground vehicle parking lot to the ground vehicle 10;

S515: the ground vehicle 10 returns back to the selected ground vehicle parking lot according to the location information of the ground vehicle parking lot.

The above steps of S511, S513, S515 can respectively refer to the above steps of S109, S111, S113 for more details, and are herein omitted for clarity.

After the user reaches a destination by taking the flight vehicle 20, the user can return the flight vehicle 20. Therefore, the method may further include:

S517: the terminal 40 sends a return request for returning the flight vehicle 20 to the server 30;

S519: the server 30 selects a flight vehicle parking lot for returning the flight vehicle 20 according to the return request and the current position information of the flight vehicle 20, and the server 30 sends the location information of the flight vehicle parking lot to the flight vehicle 20;

S521: the flight vehicle 20 returns back to the selected flight vehicle parking lot according to the location information of the flight vehicle parking lot.

The above steps of S517, S519, S521 can respectively refer to the above steps of S223, S225, S227 for more details, and are herein omitted for clarity.

Eighth Embodiment

A flying car sharing method is provided in an eighth embodiment of the present application. The method includes:

S601: the user takes a flight vehicle 20 to travel at a first position;

Specifically, when the user owns a flight vehicle 20, the user can take his/her own flight vehicle 20 to travel, wherein the first position is the parking place of the flight vehicle 20 of the user.

Alternatively, the flight vehicle 20 may also be shared under the premise of payment. As such, the user can directly go to a nearest flight vehicle parking lot to lease a flight vehicle 20 from the lessor, wherein the first position is the flight vehicle parking lot for parking the flight vehicle 20.

S603: the terminal 40 sends a call request for calling a ground vehicle 10 to the server 30, and the terminal 40 sends a second position information to the server 30;

Specifically, after the user flies for a period of time by the flight vehicle 20, if the road condition becomes good and there is no traffic jam, the user can send a call request for calling a ground vehicle 10 to the server 30 through the terminal 40, and meanwhile, a second position information is also sent to the server 30 by the terminal 40, wherein the second position information may be the location of the user when the terminal 40 sends the call request to the server 30, or a specific location that is specified by the user when the terminal 40 sends the call request to the server 30.

S605: the server 30 allocates an available ground vehicle 10 for the user according to the call request;

S607: the server 30 sends the second position information to the allocated ground vehicle 10;

S609: the allocated ground vehicle 10 moves to the second position according to the second position information, and the flight vehicle 20 lands on the landing platform 13 of the ground vehicle 10, so that the user can transfer from the flight vehicle 20 to the ground vehicle 10 and continue to travel by the ground vehicle 10.

The above steps of S605, S607, S609 can respectively refer to the above steps of S411, S413, S415 for more details, and are herein omitted for clarity.

After the user transfers from the flight vehicle 20 to the ground vehicle 10, the flight vehicle 20 is in an idle state. If the flight vehicle 20 is shared under payment, the user can choose to return the flight vehicle 20 first. Therefore, the method may further include:

S611: the terminal 40 sends a return request for returning the flight vehicle 20 to the server 30;

S613: the server 30 selects a flight vehicle parking lot for returning the flight vehicle 20 according to the return request and the current position information of the flight vehicle 20, and the server 30 sends the location information of the flight vehicle parking lot to the flight vehicle 20;

S615: the flight vehicle 20 returns back to the selected flight vehicle parking lot according to the location information of the flight vehicle parking lot.

The above steps of S611, S613, S615 can respectively refer to the above steps of S223, S225, S227 for more details, and are herein omitted for clarity.

After the user reaches a destination by taking the ground vehicle 10, the user can return the ground vehicle 10. Therefore, the method may further include:

S617: the terminal 40 sends a return request for returning the ground vehicle 10 to the server 30;

S619: the server 30 selects a ground vehicle parking lot for returning the ground vehicle 10 according to the return request and the current position information of the ground vehicle 10, and the server 30 sends the location information of the ground vehicle parking lot to the ground vehicle 10;

S621: the ground vehicle 10 returns back to the selected ground vehicle parking lot according to the location information of the ground vehicle parking lot.

The above steps of S617, S619, S621 can respectively refer to the above steps of S109, S111, S113 for more details, and are herein omitted for clarity.

From above, the present application provides a modular flying car, a flying car system and a flying car sharing method. When the traffic is not unimpeded and the road condition is good, the users can choose to travel by the ground vehicle. When there is traffic jam or the road condition is not good, the users can choose to travel by the flight vehicle. Further, the users can transfer between the ground vehicle and the flight vehicle. As there is a landing platform formed on the ground vehicle, the flight vehicle can land on the landing platform of the ground vehicle, for facilitating the users to transfer between the ground vehicle and the flight vehicle. As such, even in the case of traffic jams, the users can reach their destinations quickly. Because the flight vehicle can fly independently, the flight vehicle does not need to design the chassis, and the ground vehicle does not have to consider the aerodynamic requirements of flight in design, so that the realization of the flying car is more feasible. Further, through the sharing of the ground vehicle and the flight vehicle, it provides the users with a new way of travel selection and improves the user experience.

The above are embodiments of the present application only, and should not be deemed as limitations to the present application. Although the present application has been disclosed in embodiments as above, it is not intended to limit the present application. It should be noted that variations and improvements will become apparent to those skilled in the art to which the present application pertains. Therefore, the scope of the present application is defined by the appended claims.

What is claimed is:

1. A system comprising a ground vehicle and a flight vehicle;
    wherein the ground vehicle includes a chassis, a first cabin and a landing platform, the landing platform is configured for landing the flight vehicle;
    the flight vehicle includes a second cabin and a flight driving device, the flight vehicle is capable of landing vertically on the landing platform and connecting with the ground vehicle by interlocking, and the flight vehicle is capable of taking off vertically from the landing platform;
    the first cabin is provided at a front end of the chassis, the landing platform is provided at a rear end of the chassis and located behind the first cabin, such that when the flight vehicle is landed on the landing platform, the second cabin and the first cabin are adjoined with each other;
    the landing platform is supported on the chassis by a supporting frame, the supporting frame is connected with the chassis through a driving device, when the driving device extends out, the supporting frame is driven by the driving device to bring the landing platform to move up relative to the chassis such that the landing platform is raised up when the flight vehicle is performing takeoff or landing, and when the driving device retracts back, the supporting frame is driven by the driving device to bring the landing platform to move down relative to the chassis such that the landing platform is lowered down after the flight vehicle takes off or is landed on the landing platform.

2. The system of claim 1, wherein a first locking device is formed on the landing platform, a second locking device is formed on a bottom portion of the flight vehicle, when the flight vehicle lands on the landing platform, the first locking device and the second locking device are connected by interlocking with each other.

3. The system of claim 2, wherein the first locking device includes claws, the second locking device includes grooves, the claws are insertable into the grooves.

4. The system of claim 2, wherein the first locking device includes a first sucker and a hook, the second locking device includes a second sucker and an engaging portion, the first sucker and the second sucker are adsorbed with each other, the engaging portion is engaged with the hook.

5. The system of claim 2, wherein the first locking device includes a first sucker, an inserting groove and a locking portion formed in the inserting groove, the second locking device includes a second sucker, an inserting pole and a locking groove formed in the inserting pole, the first sucker and the second sucker are adsorbed with each other, the inserting pole is inserted into the inserting groove, the locking portion is locked in the locking groove.

6. The system of claim 1, wherein when the flight vehicle lands on the landing platform, the nose of the flight vehicle faces towards the rear end of the ground vehicle such that the nose of the flight vehicle is disposed opposite to the head of the ground vehicle, the first cabin is provided with a first cabin door confronting the second cabin, and the second cabin is provided with a second cabin door confronting the first cabin to enable the occupants to transfer between the ground vehicle and the flight vehicle via the first cabin door and the second cabin door confronting with each other, without the need to get off from the first cabin or the second cabin.

7. The system of claim 1, wherein the ground vehicle is provided with a lidar device, the lidar device is configured for detecting potential risks around the landing area and for performing alignment between the flight vehicle and the landing platform when the flight vehicle is landing on the landing platform.

8. The system of claim 1, wherein a first socket is formed on the landing platform, a second socket is formed on the flight vehicle, when the flight vehicle lands on the landing platform, the first socket and the second socket are connected by plug-in, the flight vehicle and the ground vehicle are electrically connected with each other, the ground vehicle is able to charge the flight vehicle.

9. A system comprising a ground vehicle, a flight vehicle and a server;
- wherein the ground vehicle includes a chassis, a first cabin, a landing platform, a driving controller and a first communication module, the landing platform is configured for landing the flight vehicle, the first communication module is connected with the driving controller; the flight vehicle includes a second cabin, a flight driving device, a flight controller and a second communication module, the second communication module is connected with the flight controller;
- the server includes a third communication module;
- the flight vehicle is capable of landing vertically on the landing platform and connected with the ground vehicle by interlocking, and the flight vehicle is capable of taking off vertically from the landing platform;
- the ground vehicle and the server are communicated with each other wirelessly via the first communication module and the third communication module, the flight vehicle and the server are communicated with each other wirelessly via the second communication module and the third communication module;
- the first cabin is provided at a front end of the chassis, the landing platform is provided at a rear end of the chassis and located behind the first cabin, such that when the flight vehicle is landed on the landing platform, the second cabin and the first cabin are adjoined with each other;
- the landing platform is supported on the chassis by a supporting frame, the supporting frame is connected with the chassis through a driving device, when the driving device extends out, the supporting frame is driven by the driving device to bring the landing platform to move up relative to the chassis such that the landing platform is raised up when the flight vehicle is performing takeoff or landing, and when the driving device retracts back, the supporting frame is driven by the driving device to bring the landing platform to move down relative to the chassis such that the landing platform is lowered down after the flight vehicle takes off or is landed on the landing platform.

10. The system of claim 9, wherein the ground vehicle further includes a first positioning module, the first positioning module is connected with the driving controller, the first positioning module is configured for acquiring the position information of the ground vehicle, and the position information of the ground vehicle is sent to the server through the first communication module.

11. The system of claim 9, wherein the flight vehicle further includes a second positioning module, the second positioning module is connected with the flight controller, the second positioning module is configured for acquiring the position information of the flight vehicle, and the position information of the flight vehicle is sent to the server through the second communication module.

* * * * *